United States Patent
Lee

(10) Patent No.: US 11,030,887 B2
(45) Date of Patent: Jun. 8, 2021

(54) PRECISE PREDICTIVE MAINTENANCE METHOD FOR DRIVING UNIT

(71) Applicant: ITS CO., LTD., Ulsan (KR)

(72) Inventor: Young Kyu Lee, Ulsan (KR)

(73) Assignee: ITS CO., LTD., Ulsan (KR)

( * ) Notice: Subject to any disclaimer, the term of this patent is extended or adjusted under 35 U.S.C. 154(b) by 0 days.

(21) Appl. No.: 17/019,071

(22) Filed: Sep. 11, 2020

(65) Prior Publication Data

US 2020/0410846 A1    Dec. 31, 2020

Related U.S. Application Data

(63) Continuation of application No. PCT/KR2018/015279, filed on Dec. 4, 2018.

(30) Foreign Application Priority Data

Mar. 14, 2018    (KR) ........................ 10-2018-0029568

(51) Int. Cl.
- *G08B 29/00* (2006.01)
- *G08B 31/00* (2006.01)
- *G08B 21/18* (2006.01)

(52) U.S. Cl.
CPC ........... *G08B 31/00* (2013.01); *G08B 21/182* (2013.01)

(58) Field of Classification Search
CPC .... G08B 31/00; G08B 21/182; G08B 21/187; G08B 21/185
See application file for complete search history.

(56) References Cited

U.S. PATENT DOCUMENTS

| | | | |
|---|---|---|---|
| 7,010,468 B2 | 3/2006 | Gotkis et al. | |
| 2003/0141997 A1 | 7/2003 | Kawabe et al. | |
| 2010/0094594 A1* | 4/2010 | Yamashita | G03G 15/5079 702/184 |
| 2011/0264325 A1 | 10/2011 | McLaughlin et al. | |
| 2013/0308151 A1* | 11/2013 | Kobayashi | G03G 15/5079 358/1.13 |
| 2015/0051728 A1* | 2/2015 | Kim | G05B 19/4061 700/175 |

FOREIGN PATENT DOCUMENTS

| | | |
|---|---|---|
| CN | 1435837 A | 8/2003 |
| CN | 102274031 A | 12/2011 |
| CN | 104574848 A | 4/2015 |
| CN | 105808557 A | 7/2016 |

(Continued)

OTHER PUBLICATIONS

International Search Report issued in PCT/KR2018/015279; dated Mar. 5, 2019.

(Continued)

*Primary Examiner* — Phung Nguyen
(74) *Attorney, Agent, or Firm* — Studebaker & Brackett PC

(57) ABSTRACT

The present invention relates to a precise predictive maintenance method for a driving unit and a configuration thereof includes a first base information collecting step S10 of collecting change information of an energy size, a second base information collecting step S20 of collecting a peak interval, a setting step S30 of setting an alarm gradient value for the peak interval, and a detecting step S40 of detecting the driving unit as an abnormal state.

3 Claims, 20 Drawing Sheets

(56) References Cited

FOREIGN PATENT DOCUMENTS

| | | |
|---|---|---|
| CN | 106645870 A | 5/2017 |
| JP | 2003-280707 A | 10/2003 |
| JP | 2012-083721 A | 4/2012 |
| KR | 10-0856301 B1 | 9/2008 |
| KR | 10-1643599 B1 | 7/2016 |
| KR | 10-1652461 B1 | 9/2016 |
| KR | 10-2017-0054675 A | 5/2017 |

OTHER PUBLICATIONS

Office Action mailed by China National Intellectual Property Administration dated Feb. 3, 2021, which corresponds to Chinese Patent Application No. 201880091118.6 and is related to U.S. Appl. No. 17/019,071; with English language Concise Explanation.

* cited by examiner

PRECISE PREDICTIVE MAINTENANCE METHOD FOR DRIVING UNIT

CROSS-REFERENCE TO RELATED APPLICATIONS

The present application is a continuation of International Patent Application No. PCT/KR2018/015279, filed on Dec. 4, 2018, which is based upon and claims the benefit of priority to Korean Patent Application No. 10-2018-0029568, filed on Mar. 14, 2018. The disclosures of the above-listed applications are hereby incorporated by reference herein in their entirety.

TECHNICAL FIELD

The present invention relates to a precise predictive maintenance method for a driving unit, and more particularly to, a precise predictive maintenance method for a driving unit which measures and collects a peak interval between a first peak and a second peak from driving information of a driving unit in a normal state and driving information of the driving unit before a malfunction is generated and sets an alarm upper limit and an alarm lower limit and an alarm gradient value for the peak interval based on the collected information to compare the peak interval collected in real time by the driving of the driving unit and a gradient value with the alarm upper limit, the alarm lower limit, and the alarm gradient value to issue an alarm when a suspected abnormal condition of the driving unit is satisfied and induce the driving unit to be repaired or replaced at a right time, thereby preventing a huge loss caused by the malfunction of the driving unit in advance.

BACKGROUND ART

Generally, stable driving is very important for a driving unit (for example, a motor, a pump, a conveyer, and a compressor) used for an automation process of equipment.

For example, hundreds of driving units are installed in the facilities of a large-scale transfer factory to continuously transfer materials to be transferred while interlocking with each other. If any one of the plurality of driving units is broken, a tremendous situation in which the entire operation of the facilities is stopped may occur.

In this case, due to the down-time caused by the malfunction of the driving unit, a huge loss may be caused by not only the repair cost of the driving unit, but also the operating cost which is wasted while the facilities are stopped and the business effect.

According to the recent data of the Ministry of Employment and Labor and the Korea Occupational Safety and Health Agency, the total number of casualties resulting from annual industry safety accidents is estimated to be about 100,000 and when it is converted into the cost, it is estimated that 18 trillion won is lost annually.

As a way to avoid such unexpected down-time costs, it is urgent to introduce a preliminary predictive maintenance system. Even though there was an effort to improve the problems in the name of predictive maintenance, for more effective predictive maintenance, it is necessary to develop a more advanced predictive maintenance method.

DISCLOSURE

Technical Problem

The present invention is proposed to solve the problems as described above, and an object of the present invention is to provide a precise predictive maintenance method for a driving unit which measures and collects a peak interval between a first peak and a second peak from driving information of a driving unit in a normal state and driving information of the driving unit before a malfunction is generated and sets an alarm upper limit and an alarm lower limit and an alarm gradient value for the peak interval based on the collected information to compare the peak interval collected in real time by the driving of the driving unit and a gradient value with the alarm upper limit, the alarm lower limit, and the alarm gradient value to issue an alarm when a suspected abnormal condition of the driving unit is satisfied and induce the driving unit to be repaired or replaced at a right time, thereby preventing a huge loss caused by the malfunction of the driving unit in advance.

Further, another object is to provide a precise predictive maintenance method which presents various detection conditions in order to search for various abnormal signs which may occur in the driving unit and issues an alarm to the user when the detection conditions are satisfied to not only easily detect various abnormal signs generated in the driving unit, but also ensure an excellent reliability for a detection result.

Technical Solution

According to an aspect of the present invention, a precise predictive maintenance method for a driving unit includes: a first base information collecting step S10 of collecting change information of an energy size in accordance with a time measured in a normal driving state of the driving unit by dividing the change information of the energy size into a first peak with the largest energy size and a second peak with a largest energy size after the first peak to collect a peak interval between the first peak and the second peak in which the change information of the energy size in accordance with the time of the driving unit is configured such that the driving periods including the first peak and the second peak are repeatedly formed and connecting the peak interval of the first peak and the second peak of the driving period and a peak interval of repetitive another driving period to collect gradient information for the peak interval between the driving period, a second base information collecting step S20 of connecting a peak interval of the first peak and the second peak of the driving period from the change information of the energy size in accordance with the time measured in a driving state of the driving unit before the malfunction of the driving unit is generated and a peak interval of repetitive another driving period to collect gradient information of the peak intervals between the driving periods, a setting step S30 of setting an alarm gradient value for the peak interval between the driving periods based on the gradient information collected in the base information collecting steps S10 and S20, and a detecting step S40 of detecting the driving unit to be an abnormal state when an average gradient value for the peak interval between the driving periods measured with an interval of unit times set in the real-time driving state of the driving unit exceeds the alarm gradient value set in the setting step S30, wherein the unit time is set to include at least two driving periods, a searching period is set in the driving period of the driving unit, a largest energy value in the set searching period is extracted as a first peak, and an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit.

Further, in the first base information collecting step S10, an energy value of the second peak of a driving period in a normal driving state of the driving unit and an energy value of a second peak in repetitive another driving period are connected to collect gradient information for an energy value of the second peak between the driving periods, in the second base information collecting step S20, an energy value of the second peak of a driving period in a driving state of the driving unit before the malfunction of the driving unit is generated and an energy value of a second peak in repetitive another driving period are connected to collect gradient information for an energy value of the second peak between the driving periods, in the setting step S30, an alarm gradient value for the energy value of the second peak between the driving periods is set based on the gradient information collected in the base information collecting steps, and In the detecting step S40, when an average gradient value for the energy value of the second peak between the driving periods measured with the interval of unit times set in the real-time driving state of the driving unit exceeds the alarm gradient value set in the setting step, the driving unit is detected to be abnormal state and the unit time is set to include at least two driving periods.

Further, in the first base information collecting step S10, a peak interval between the first peak and the second peak of the driving period in a normal driving state of the driving unit and a peak interval between the first peak and the second peak of repetitive another driving period are connected to collect gradient information of the peak interval between the driving periods, In the second base information collecting step S20, a peak interval between the first peak and the second peak of the driving period in a driving state of the driving unit before the malfunction of the driving unit is generated and a peak interval of repetitive another driving period are connected to collect gradient information of the peak intervals between the driving periods. In the setting step S30, an alarm gradient value for the peak interval between the driving periods is set based on the gradient information collected in the base information collecting steps S10 and S20. In the detecting step S40, when an average gradient value for the peak interval between the driving periods measured with the interval of unit times set in the real-time driving state of the driving unit exceeds the alarm gradient value set in the setting step S30, the driving unit is detected to be an abnormal state and the unit time is set to include at least two driving periods.

Further, a period between a starting point and an ending point is set with the starting point when an energy value of the driving unit exceeds the set offset value and the ending point when the energy value of the driving unit falls below the offset value as the driving period to extract the repetitive driving period or the change information of the energy size in accordance with the time of the driving unit is forcibly divided in accordance with the set peak interval and the divided period is set as the driving period to extract the repetitive driving period.

Further, in the first base information collecting step S10, a peak interval between the first peak and the second peak is collected from the change information of the energy size in accordance with a time measured in the normal driving state of the driving unit, in the second base information collecting step S20, a peak interval between the first peak and the second peak is collected from the change information of the energy size in accordance with a time measured in a driving state of the driving unit before the malfunction of the driving unit is generated, in the setting step S30, an alarm upper limit and an alarm lower limit for the peak interval between the first peak and the second peak are set based on information collected in the base information collecting steps S10 and S20, and in the detecting step S40, a peak interval between the first peak and the second peak is measured from the change information of an energy size in accordance with a time measured in a real-time driving state of the driving unit and the driving unit is detected to be an abnormal state when the measured peak interval exceeds the alarm upper limit set in the setting step S30 or is lower than the alarm lower limit.

Further, in the first base information collecting step S10, the information about the energy value of the first peak and the energy value of the second peak is collected from the change information of the energy size in accordance with the time measured in the normal driving state of the driving unit, in the second base information collecting step S20, the information about the energy value of the first peak and the energy value of the second peak is collected from the change information of the energy size in accordance with the time measured in the driving state of the driving unit before the malfunction of the driving unit is generated, in the setting step S30, an alarm upper limit and an alarm lower limit for the energy value of the first peak and the second peak are set based on the information collected in the base information collecting steps S10 and S20, and in the detecting step S40, when the first peak or the second peak energy values of the change information of the energy size in accordance with the time measured in the real-time driving state of the driving unit exceeds the alarm upper limit of the first peak or the second peak set in the setting step S30 or is lower than the alarm lower limit, the driving unit is detected to be an abnormal state.

Advantageous Effects

According to the present invention, a precise predictive maintenance method for a driving unit collects a peak interval between a first peak and a second peak from driving information of a driving unit in a normal state and driving information of the driving unit before a malfunction is generated and sets an alarm upper limit and an alarm lower limit and an alarm gradient value for the peak interval based on the collected information to compare the peak interval collected in real time by the driving of the driving unit and a gradient value with the alarm upper limit, the alarm lower limit, and the alarm gradient value to issue an alarm when a suspected abnormal condition of the driving unit is satisfied and induce the driving unit to be repaired or replaced at a right time, thereby preventing a huge loss caused by the malfunction of the driving unit in advance.

Further, the precise predictive maintenance method presents various detection conditions in order to search for various abnormal signs which may occur in the driving unit and issues an alarm to the user when the detection conditions are satisfied, thereby not only easily detecting various abnormal signs generated in the driving unit, but also ensuring an excellent reliability for a detection result.

BEST MODE

The present invention relates to a precise predictive maintenance method for a driving unit and a configuration thereof includes a first base information collecting step S10 of collecting change information of an energy size in accordance with a time measured in a normal driving state of the driving unit by dividing the change information of the energy size into a first peak with the largest energy size and a second peak with a largest energy size after the first peak to collect a peak interval between the first peak and the second peak in which the change information of the energy size in accordance with the time of the driving unit is configured such that the driving periods including the first peak and the second peak are repeatedly formed and connecting the peak interval of the first peak and the second peak of the driving period and a peak interval of repetitive another driving period to collect gradient information for the peak interval between the driving period, a second base information collecting step S20 of collecting a peak interval of the first peak and the second peak of the driving period from the change information of the energy size in accordance with the time measured in a driving state of the driving unit before the malfunction of the driving unit is generated and a peak interval of repetitive another driving period are connected to collect gradient information of the peak intervals between the driving periods, a setting step S30 of setting an alarm gradient value for the peak interval between the driving periods based on the gradient information collected in the base information collecting steps S10 and S20, and a detecting step S40 of detecting the driving unit as an abnormal state when an average gradient value for the peak interval between the driving periods measured with an interval of unit times set in the real-time driving state of the driving unit exceeds the alarm gradient value set in the setting step S30.

MODE FOR CARRYING OUT THE INVENTION

A precise predictive maintenance method for a driving unit according to an exemplary embodiment of the present invention will be described in detail based on the accompanying drawings. A detailed description of known functions and configurations determined to unnecessarily obscure the gist of the present invention will be omitted.

Figure 1:
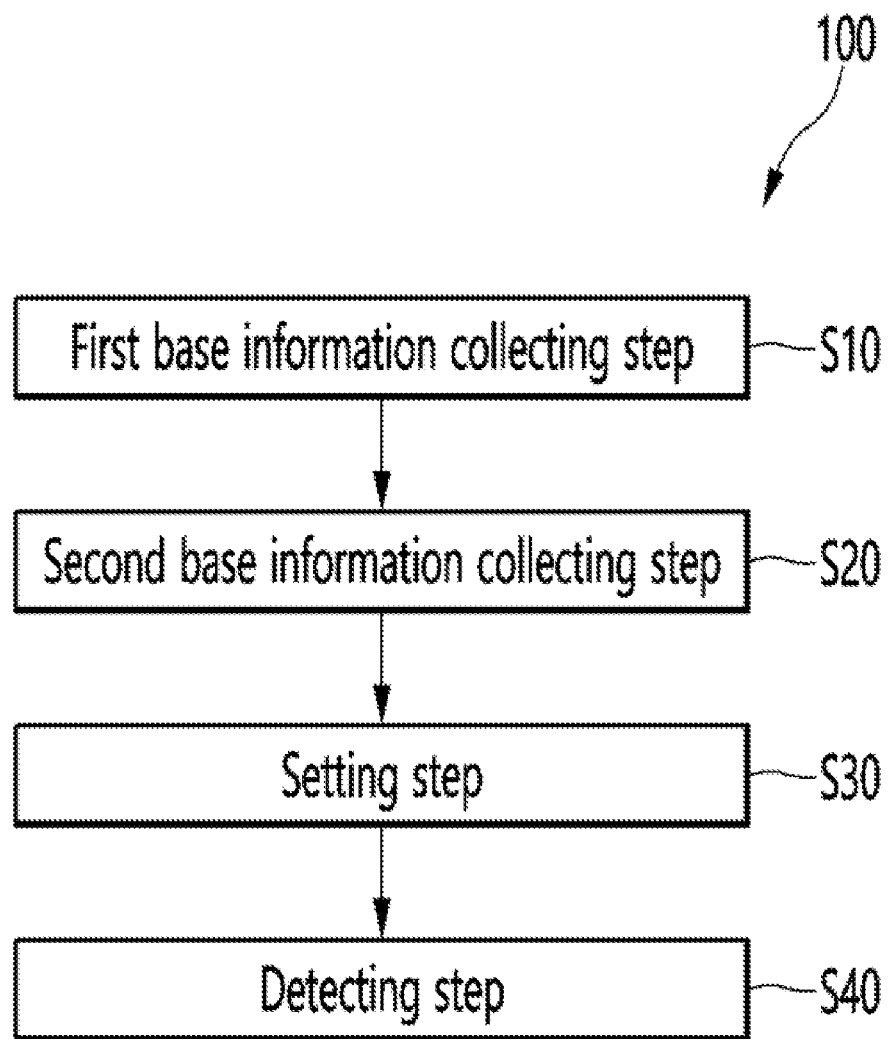
FIG. 1 is a block diagram of a precise predictive maintenance method for a driving unit according to an embodiment of the present invention.
Figure 2:
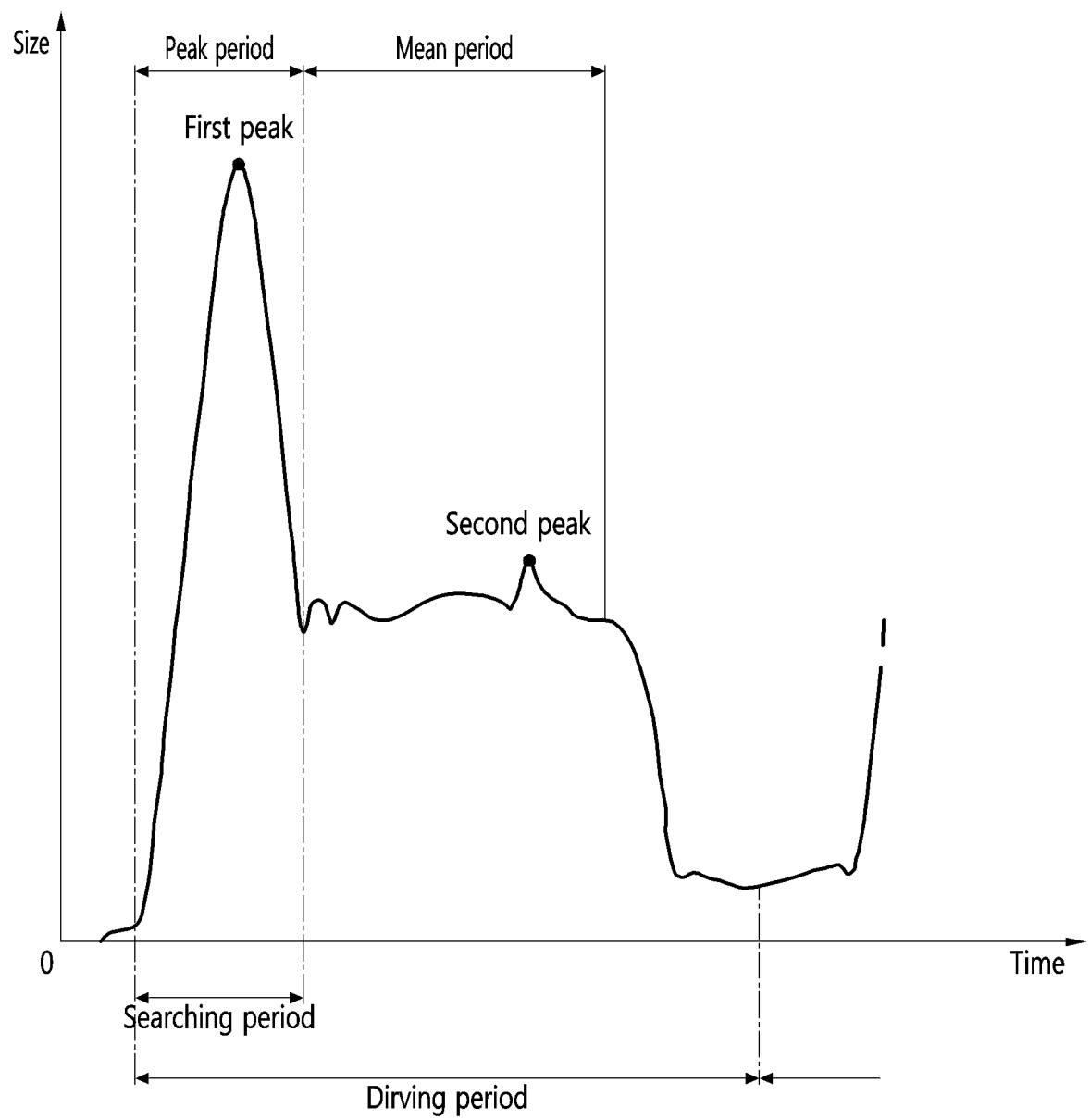
FIGS. 2 and 3 are views for extracting a first peak and a second peak with a peak period of a driving unit as a searching period.
Figure 3:
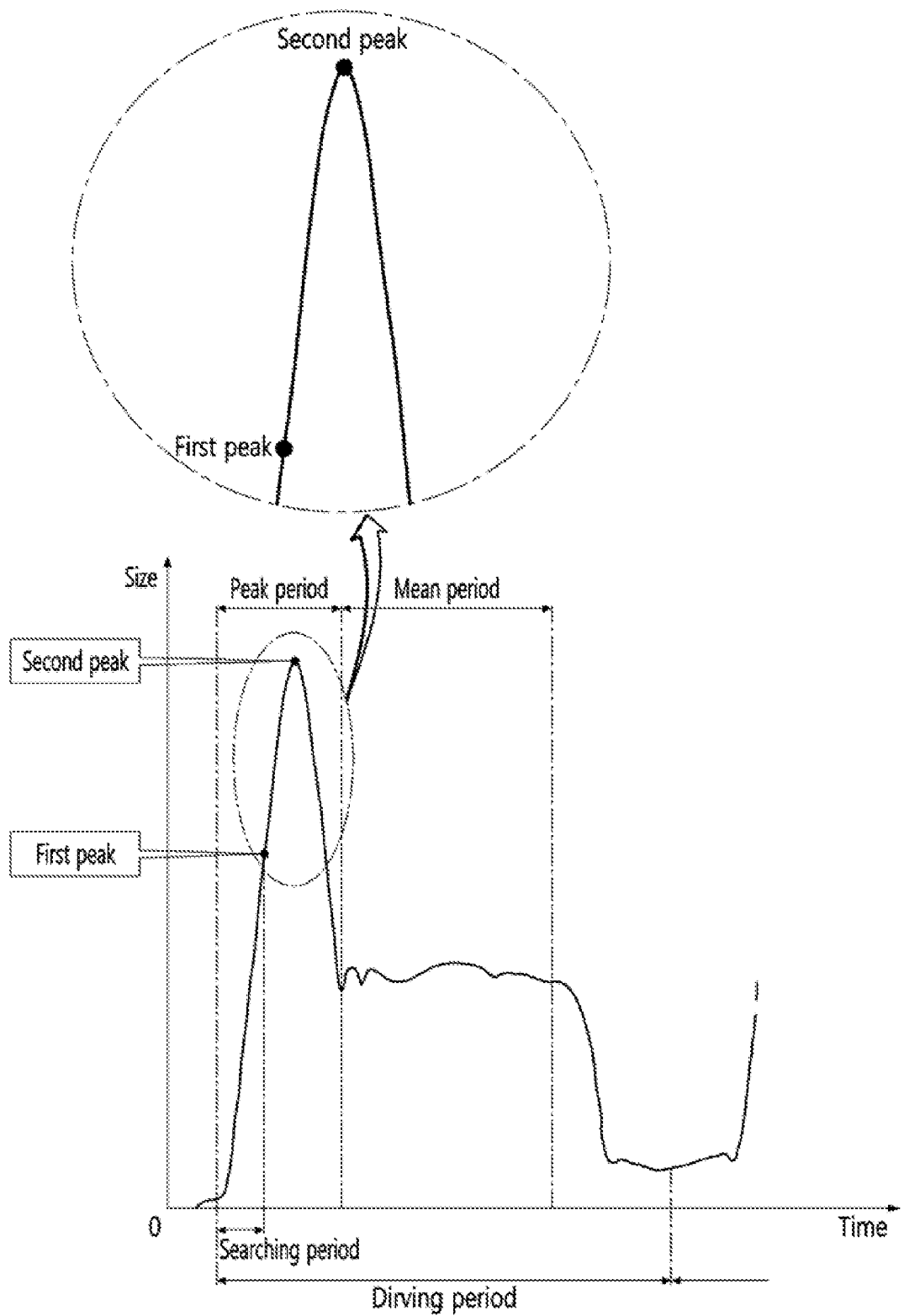
Figure 4:
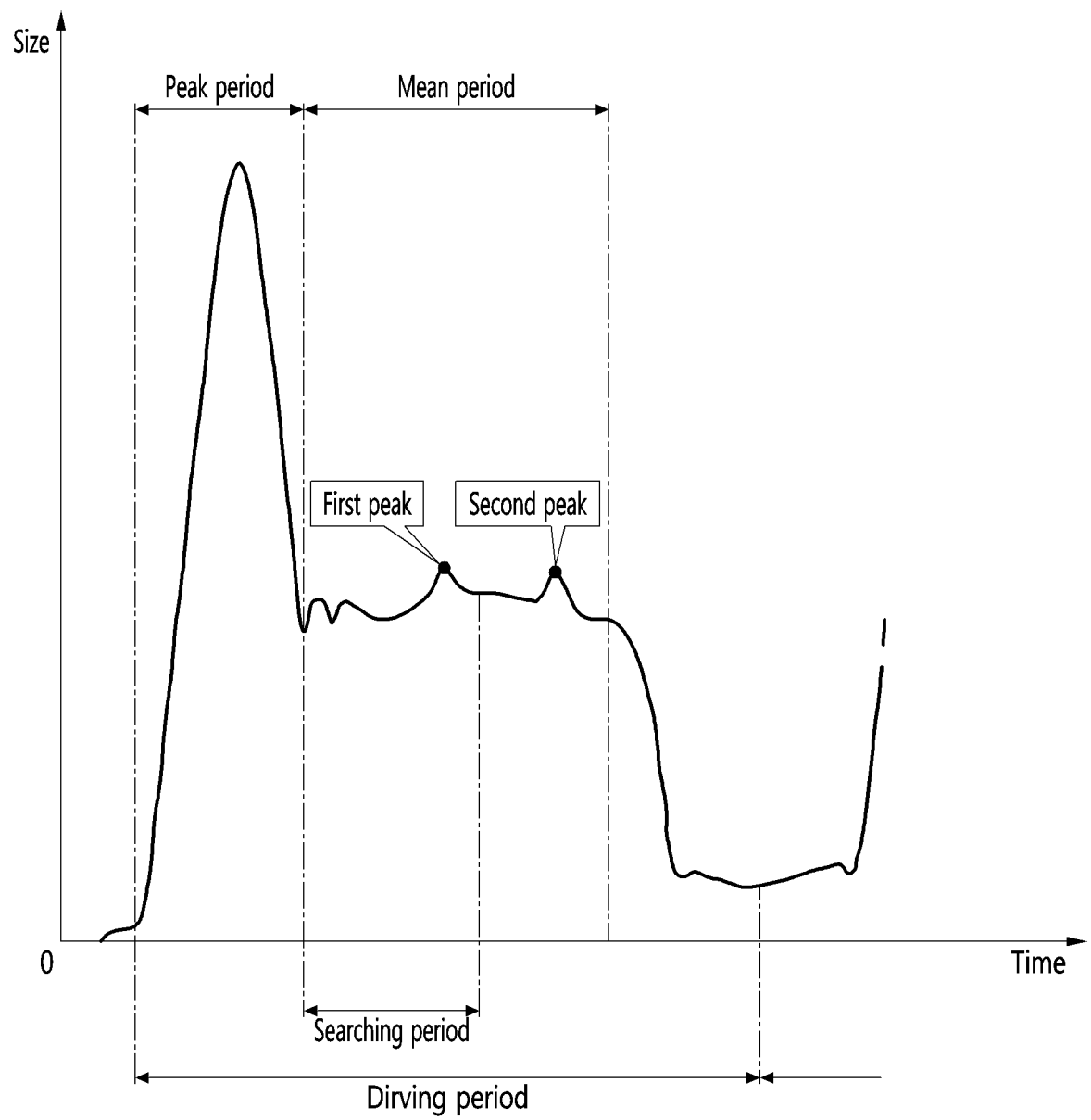
FIG. 4 is a view for extracting a first peak and a second peak with a mean period of a driving unit as a searching period.
Figure 5:
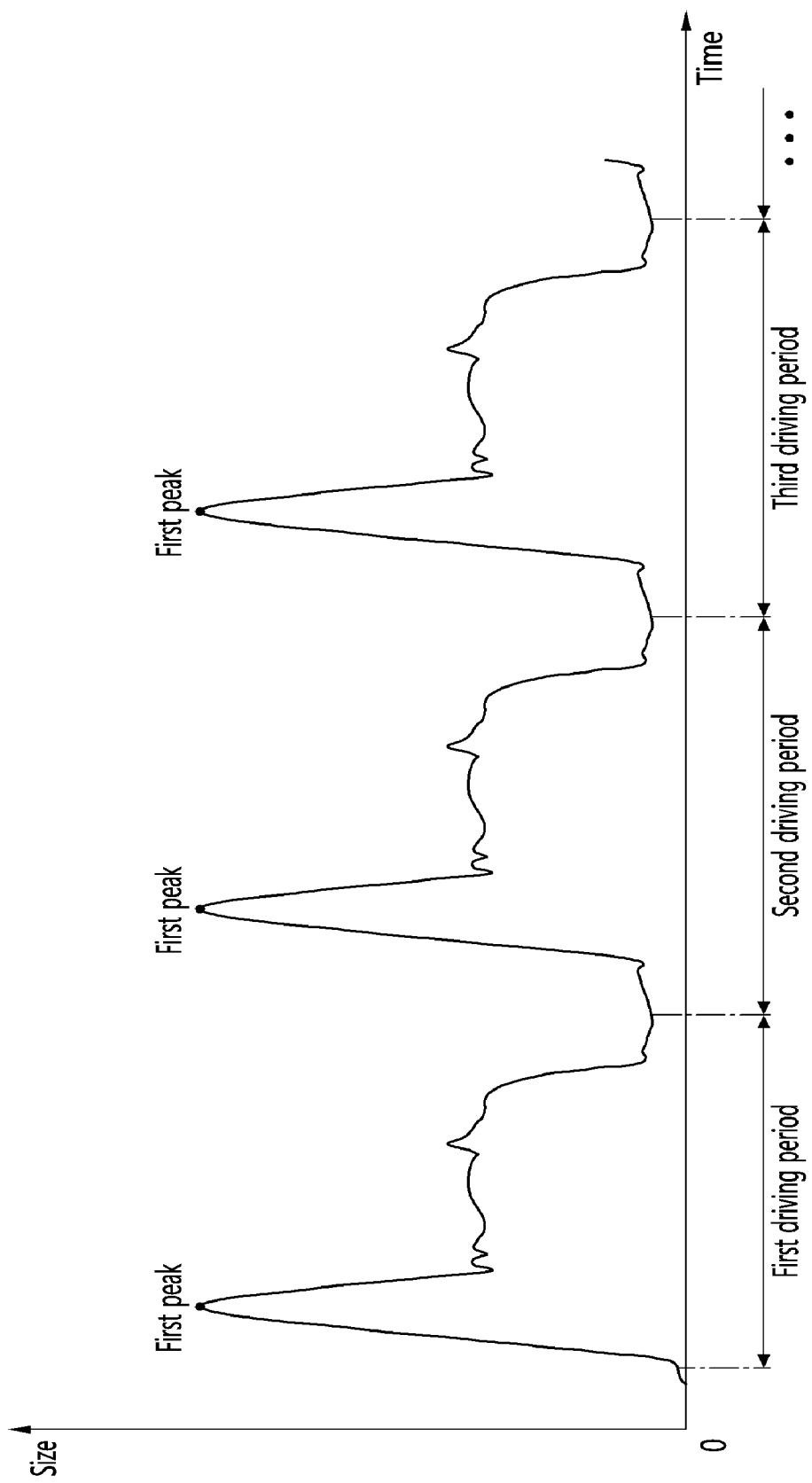
FIG. 5 is a view for extracting a first peak value from a repetitive driving period of the driving unit.
Figure 6:
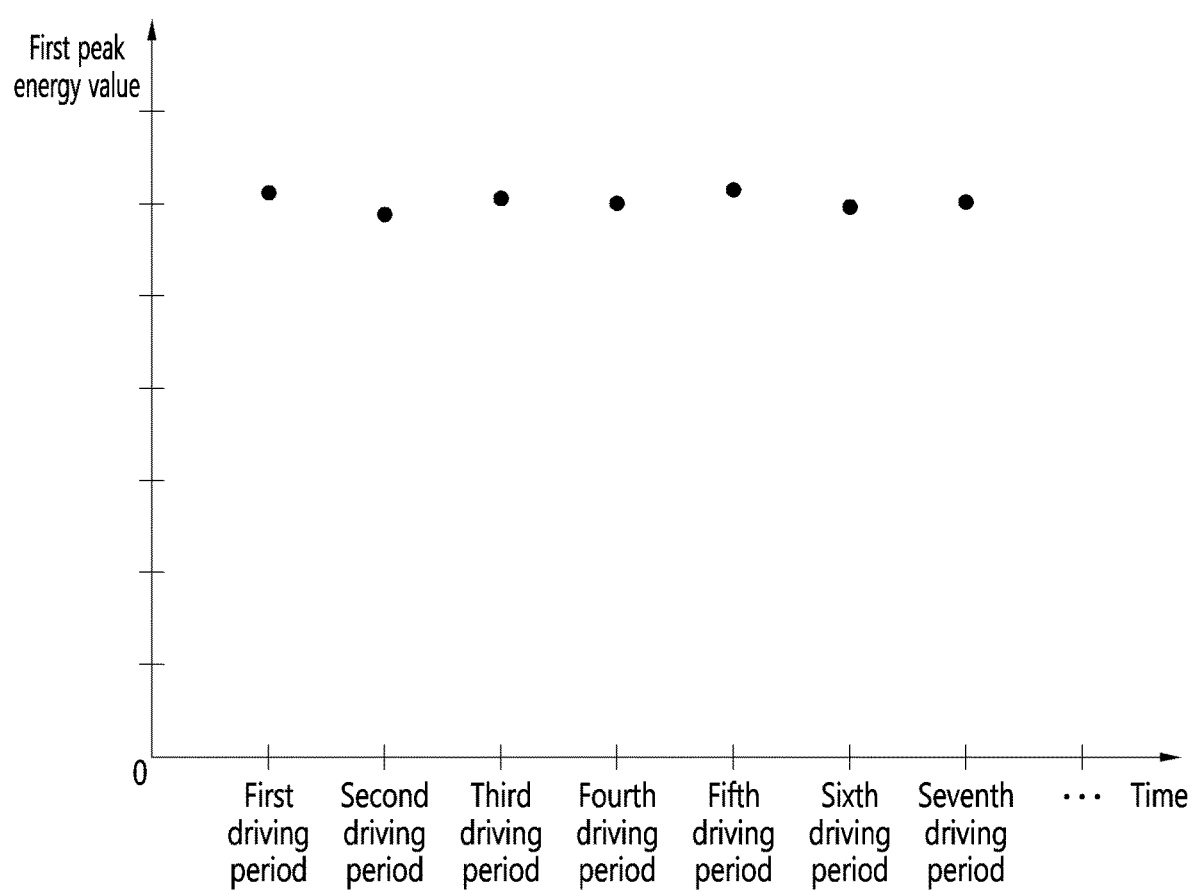
FIG. 6 is a view illustrating a numerical value of a first peak value illustrated in FIG. 5.
Figure 7:
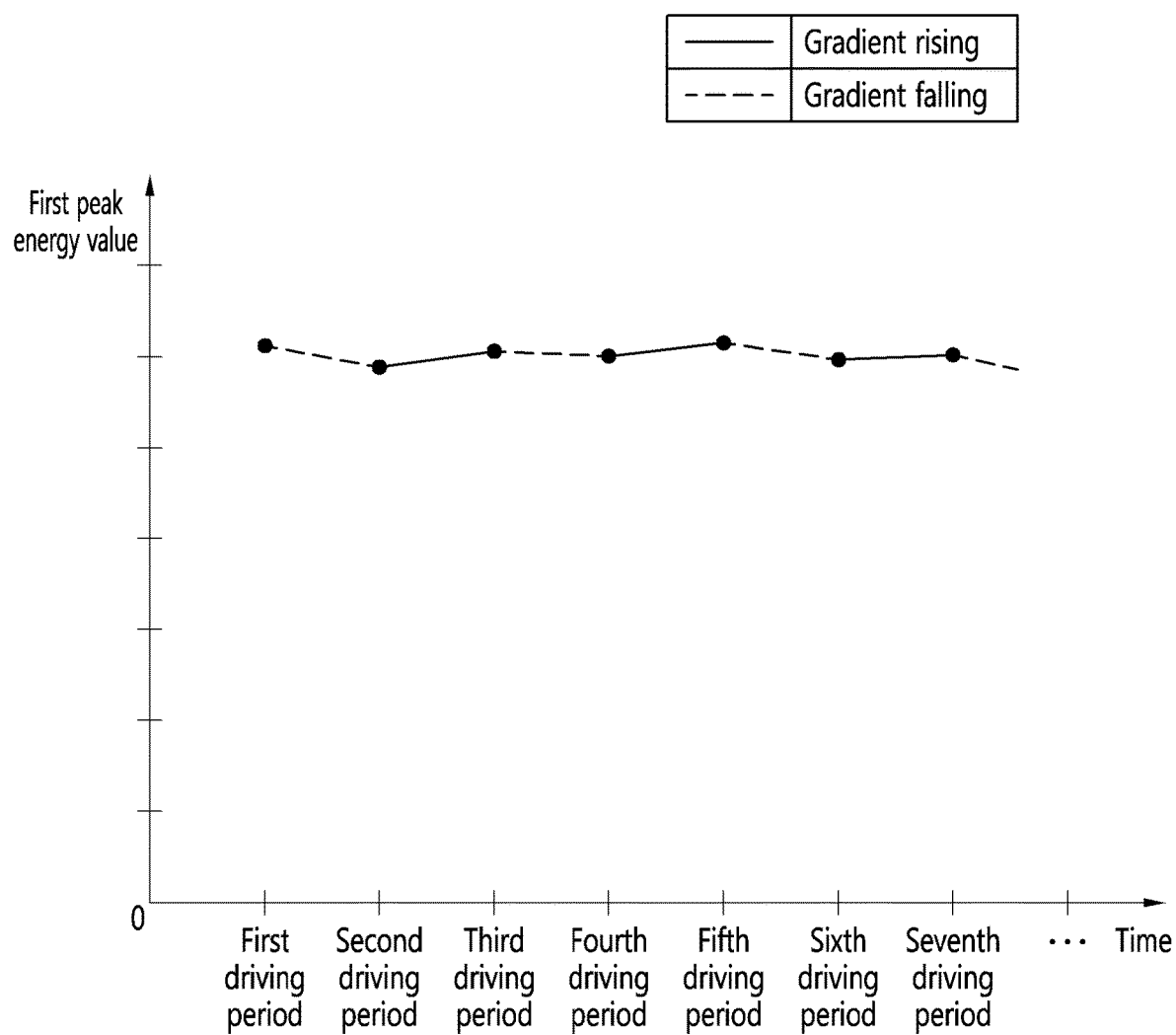
FIG. 7 is a view for extracting a gradient value for a first peak value illustrated in FIG. 6.
Figure 8:
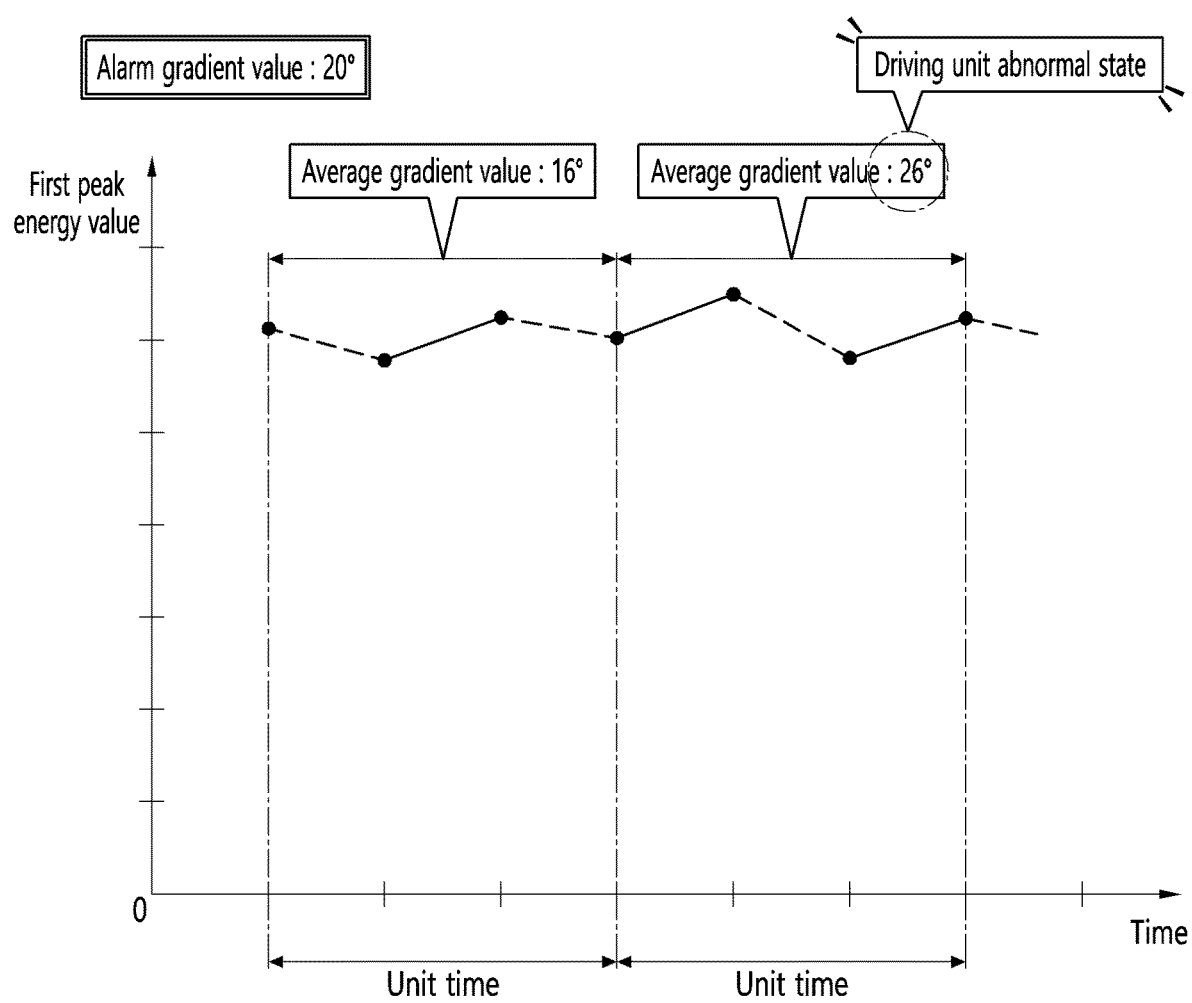
FIG. 8 is a view for extracting an average gradient value of first peak values between driving periods measured with an interval of unit times.
Figure 9:
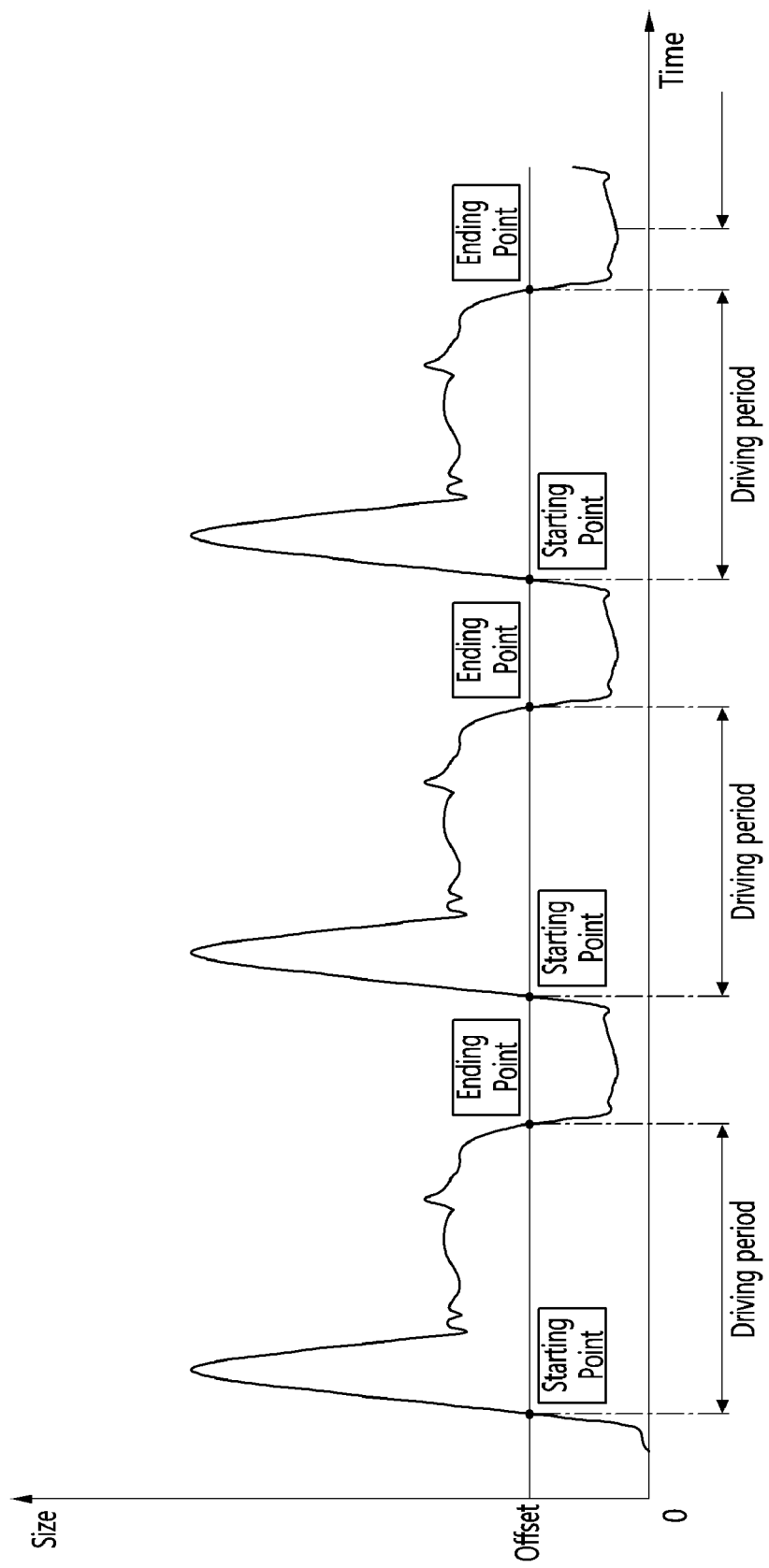
FIG. 9 is a view for extracting a driving period from a driving unit which is repeatedly driven and paused.
Figure 10:
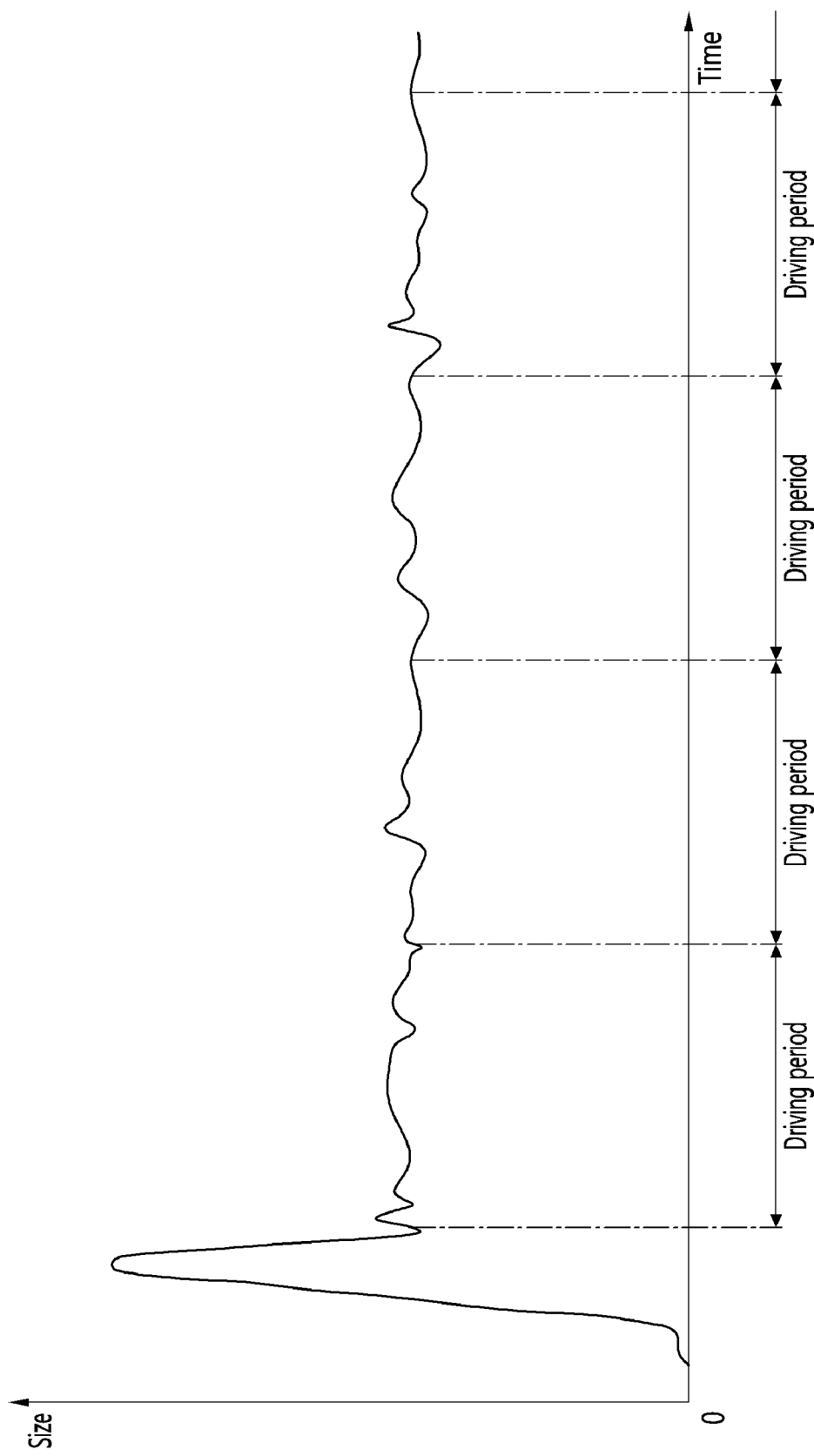
FIG. 10 is a view for extracting a driving period from a driving unit which is continuously driven.
Figure 11:
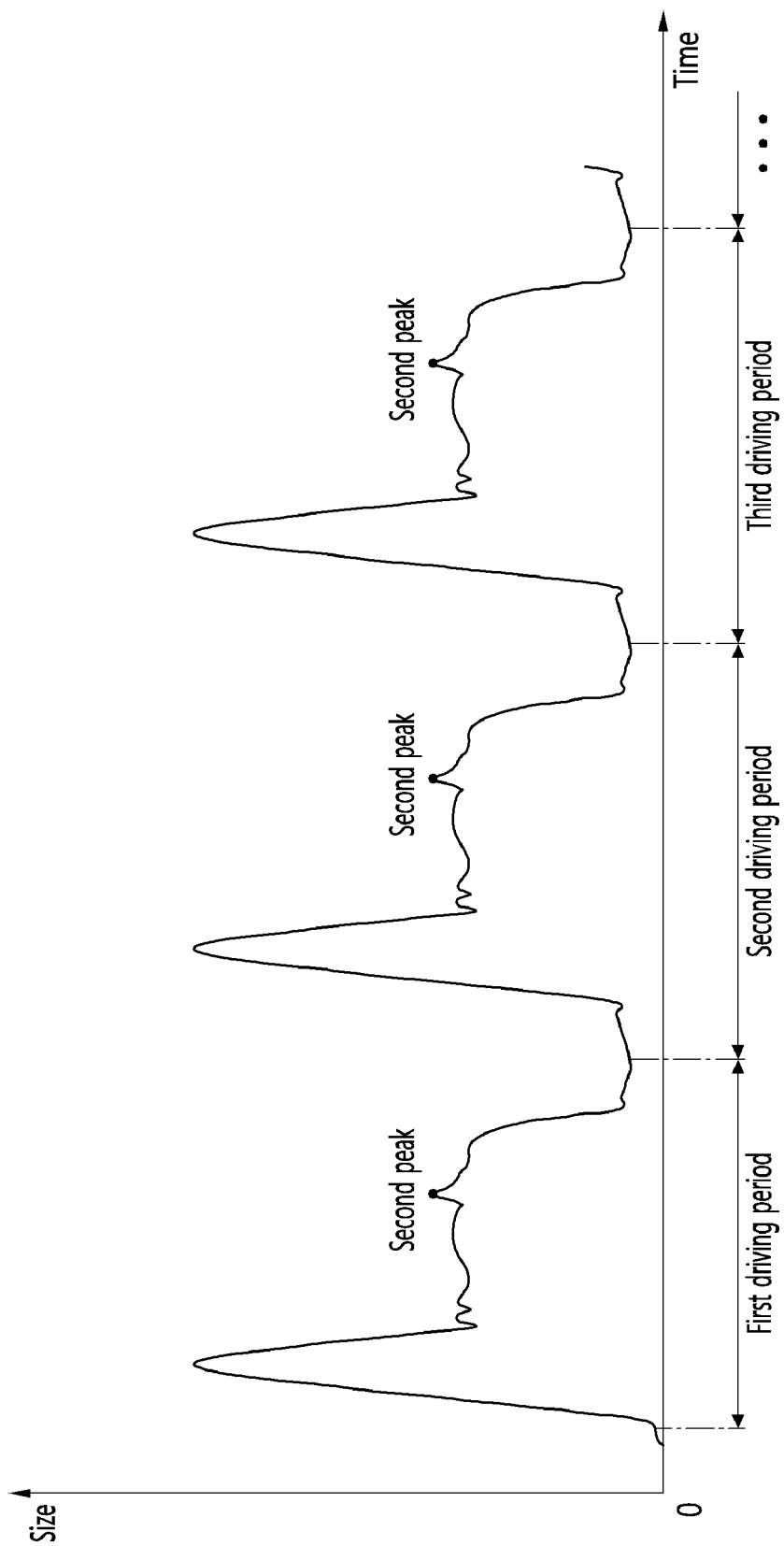
FIG. 11 is a view for extracting a second peak value from a repetitive driving period of the driving unit.
Figure 12:
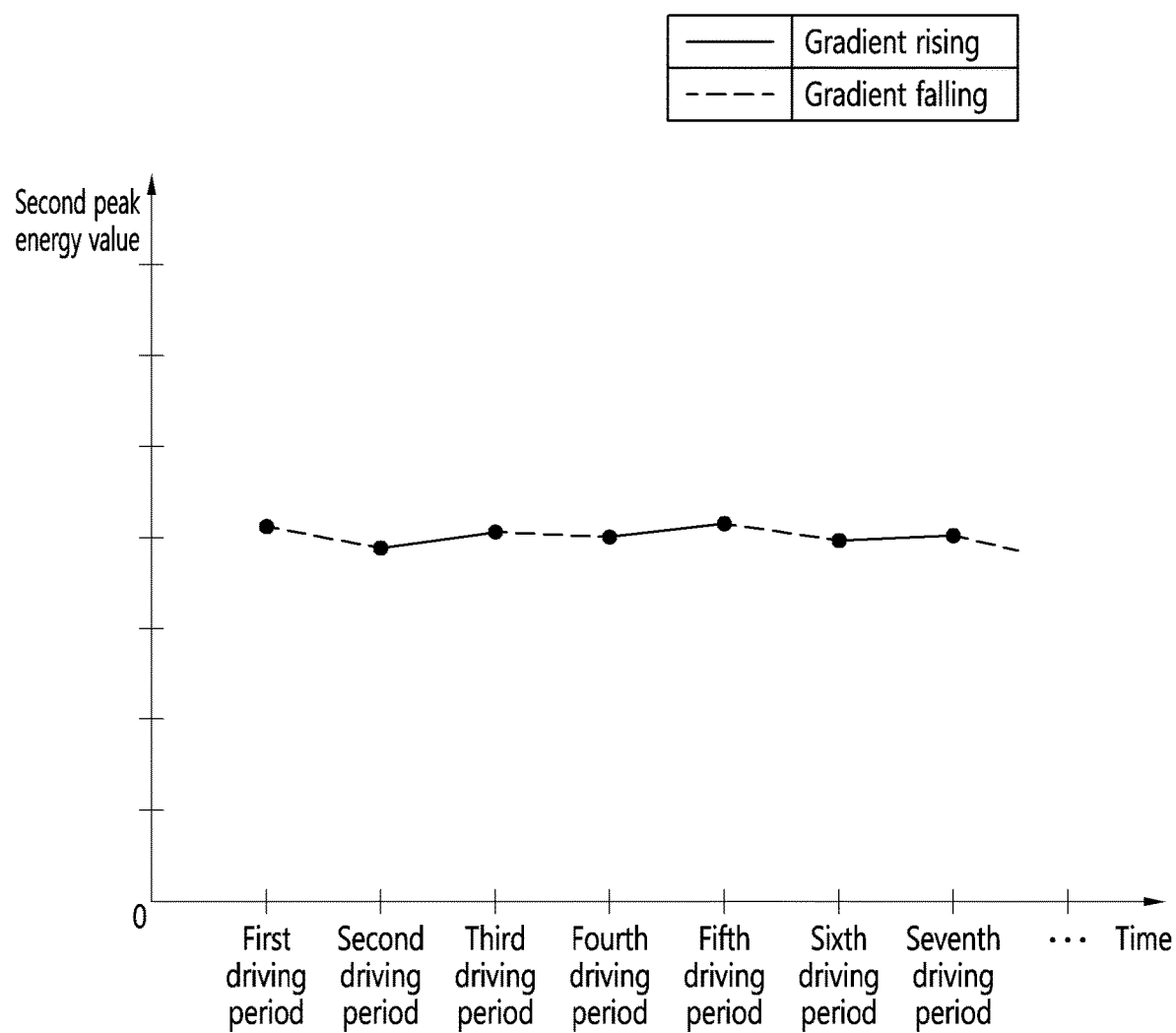
FIG. 12 is a view for extracting a gradient value for a second peak value extracted in FIG. 11.
Figure 13:
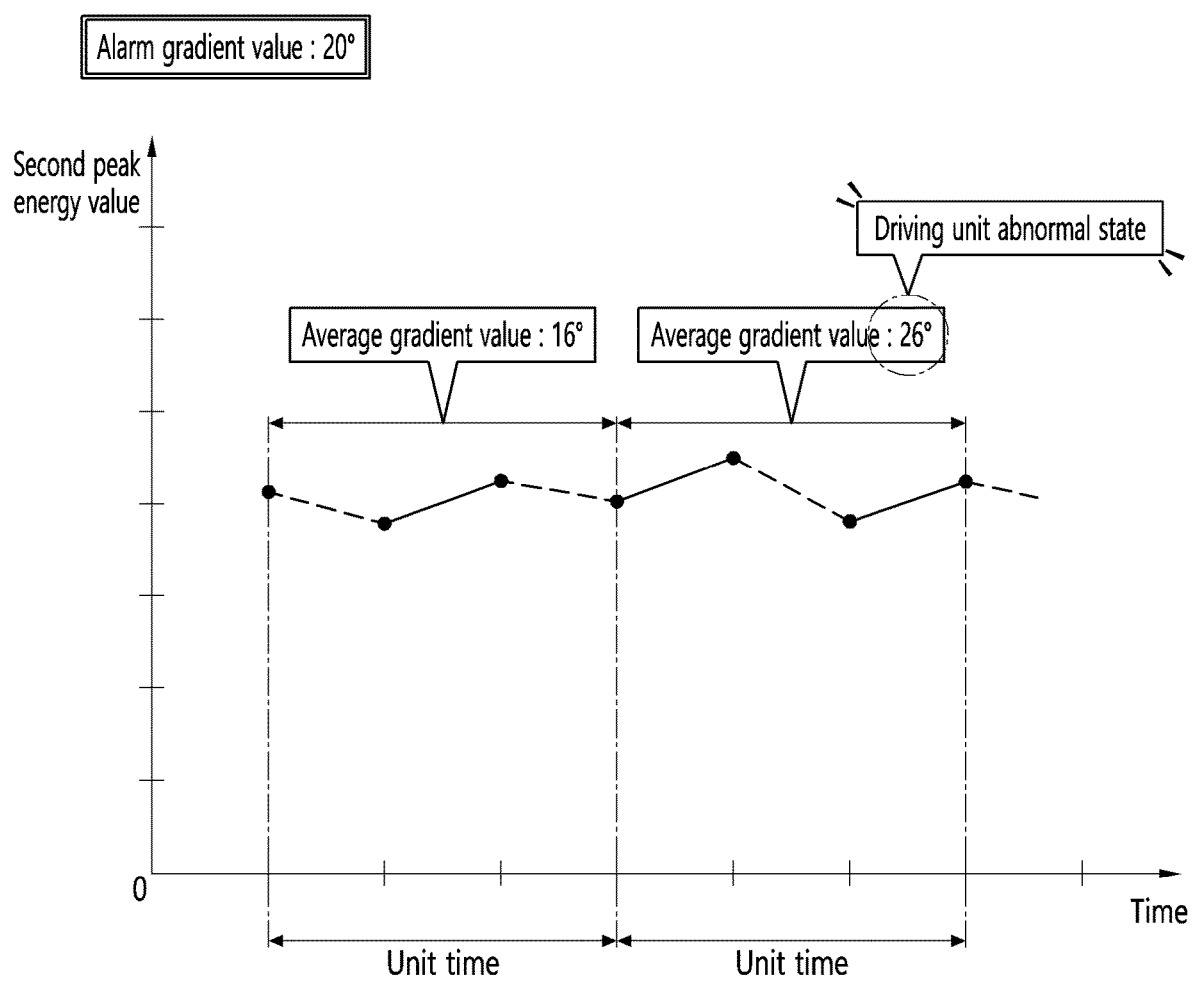
FIG. 13 is a view for extracting an average gradient value of first peak values between driving periods measured with an interval of unit times.
Figure 14:
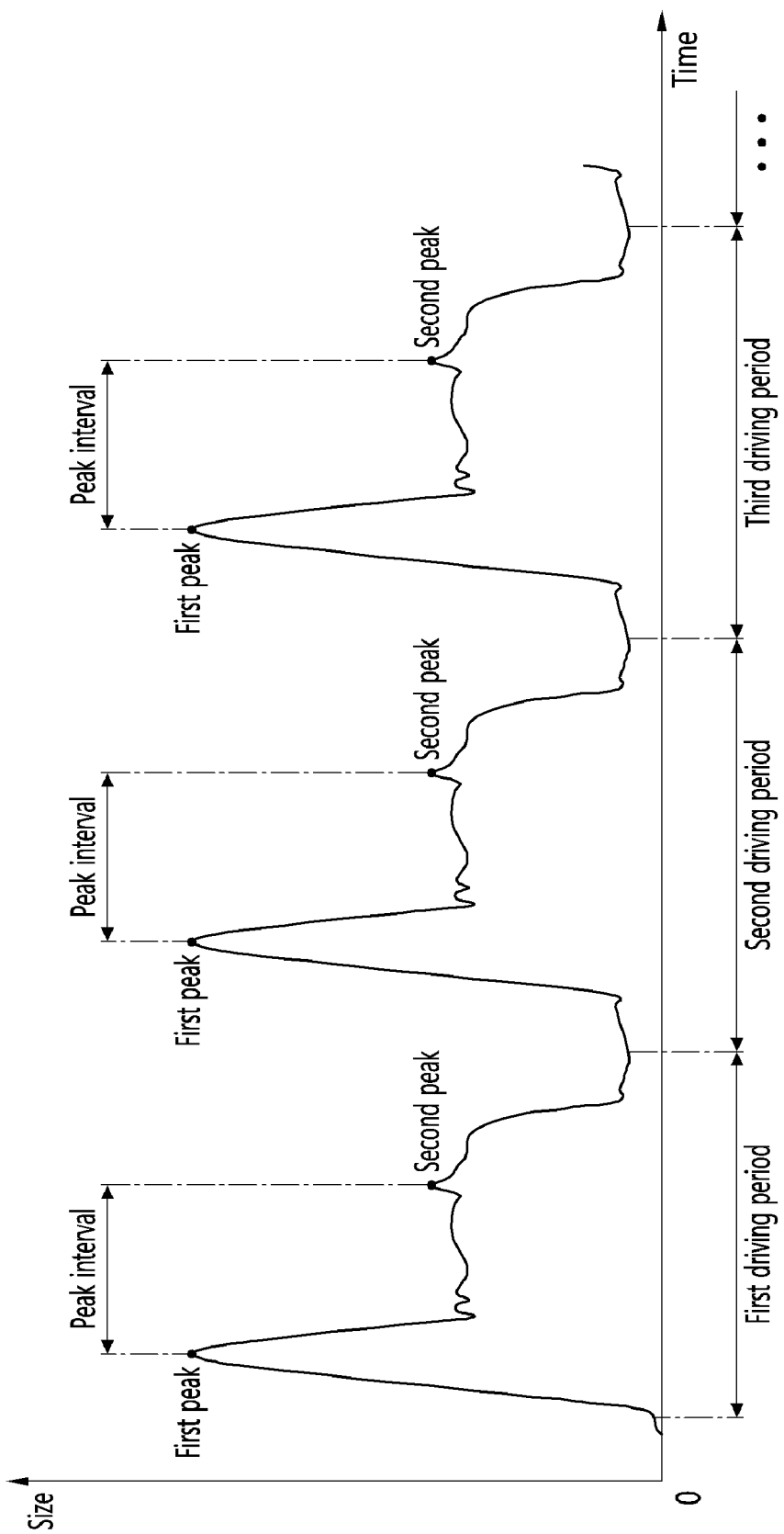
FIG. 14 is a view illustrating a peak interval between a first peak and a second peak of a driving period.
Figure 15:
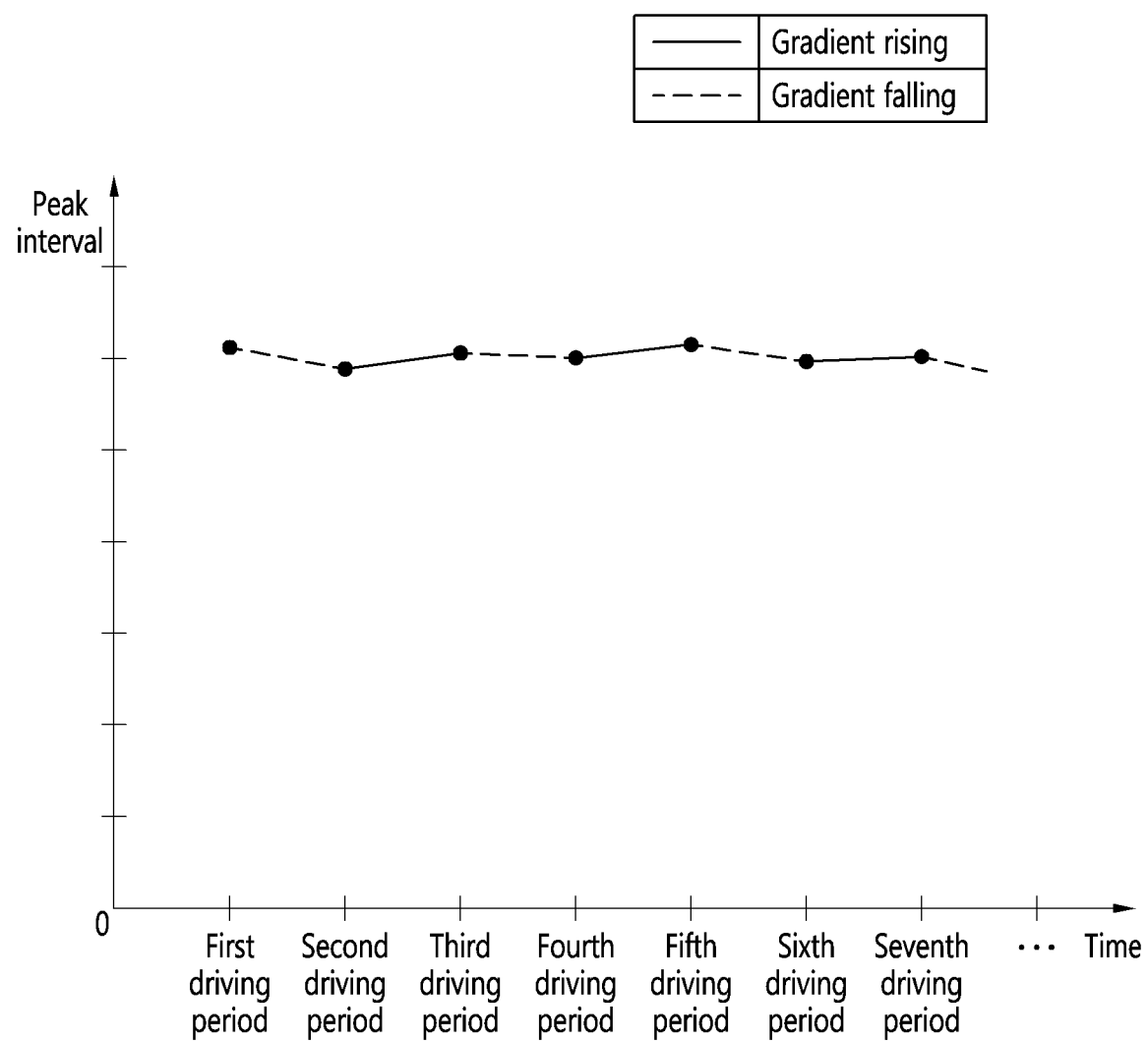
FIG. 15 is a view for extracting a gradient value for the peak interval illustrated in FIG. 14.
Figure 16:
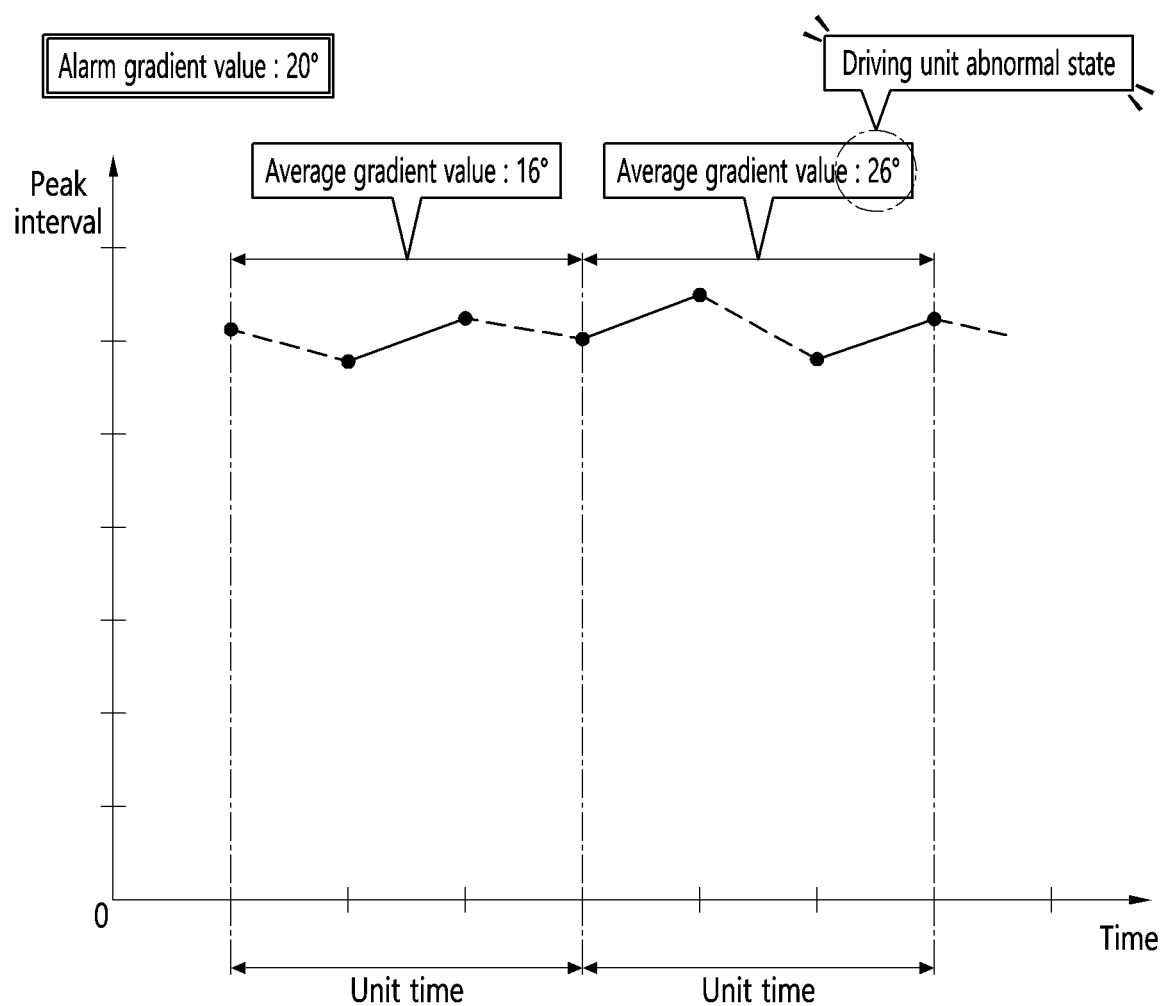
FIG. 16 is a view for extracting an average gradient value of the peak interval between driving periods measured with an interval of unit times.
Figure 17:
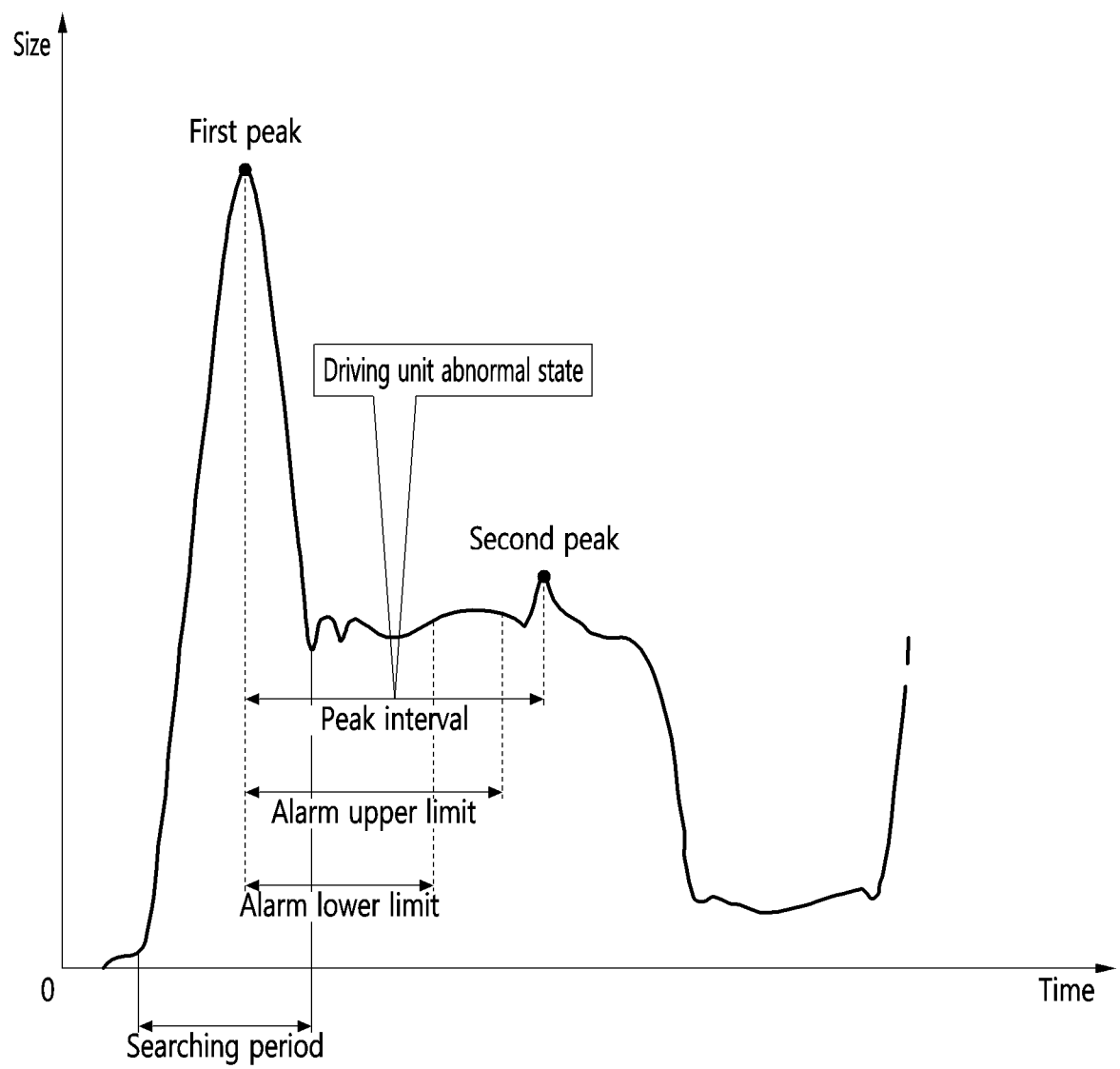
FIGS. 17 and 18 are views for detecting an abnormal state of a driving unit based on a peak interval between a first peak and a second peak measured in a real-time driving state of the driving unit.
Figure 18:
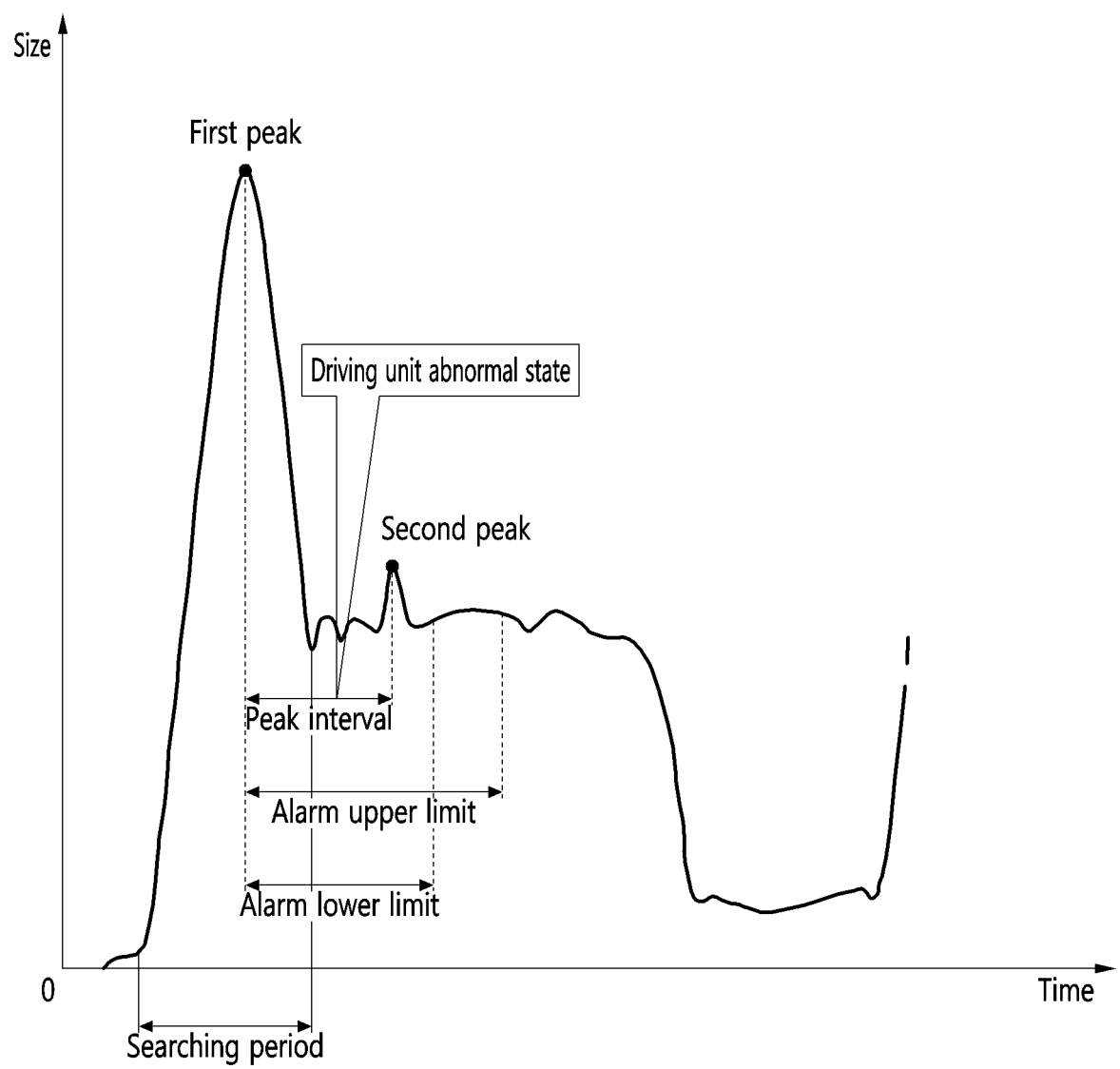
Figure 19:
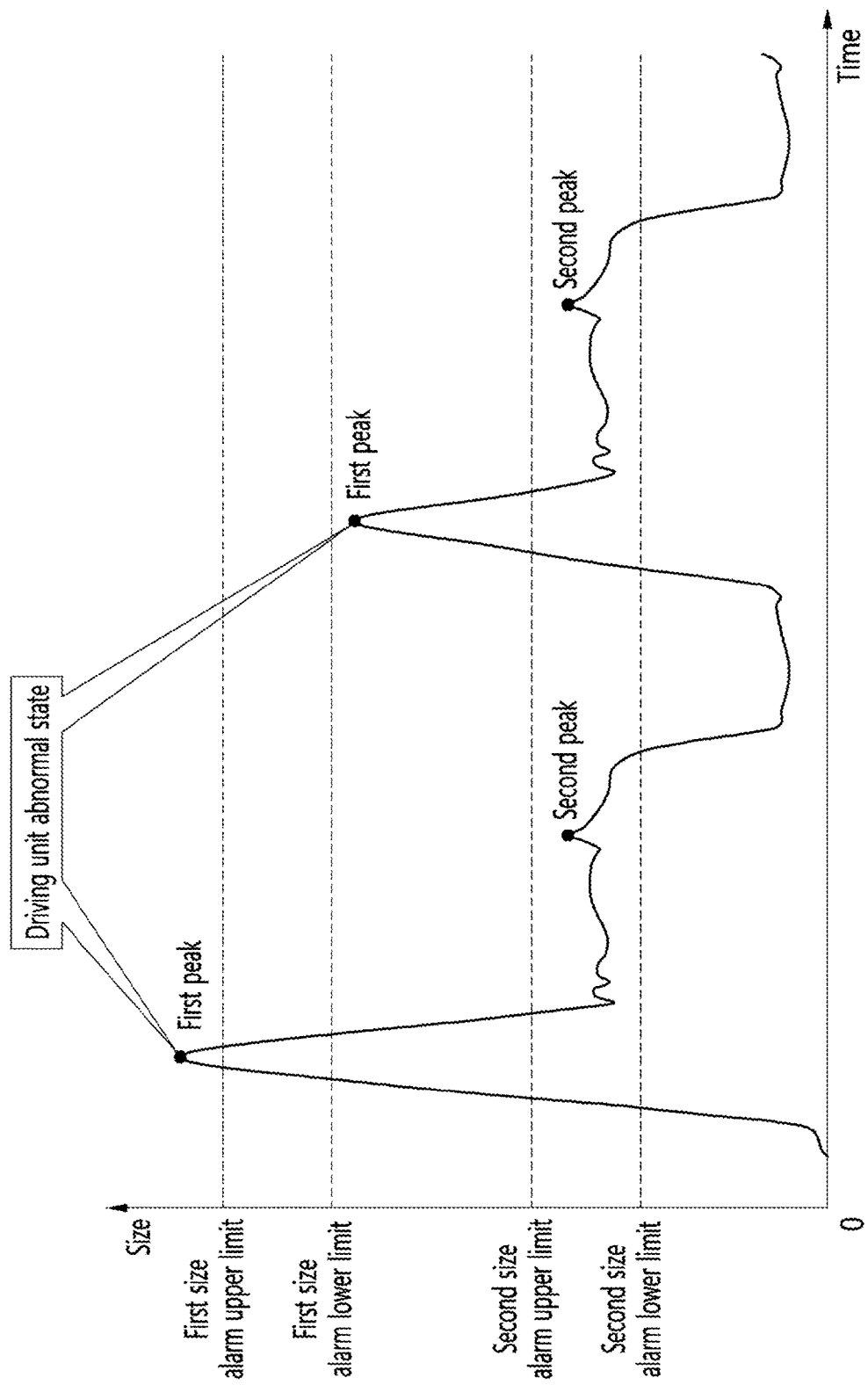
FIGS. 19 and 20 are views for detecting an abnormal state of a driving unit based on a first peak value and a second peak value measured in a real-time driving state of the driving unit.
Figure 20:
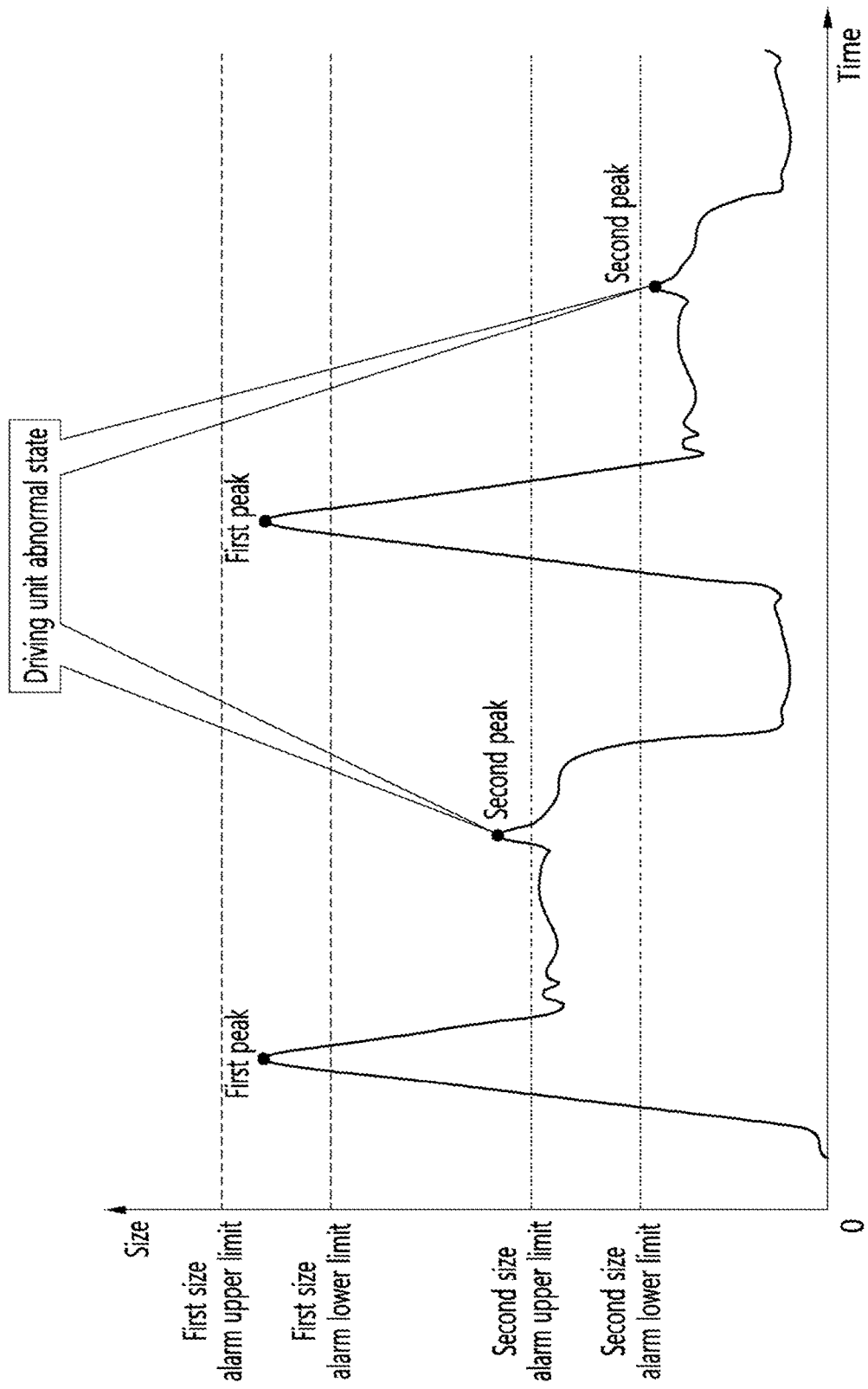

FIGS. 1 to 20 illustrate a precise predictive maintenance method for a driving unit according to the exemplary embodiment of the present invention, in which FIG. 1 is a block diagram of a precise predictive maintenance method for a driving unit according to an embodiment of the present invention, FIGS. 2 and 3 are views for extracting a first peak and a second peak with a peak period of a driving unit as a searching period, FIG. 4 is a view for extracting a first peak and a second peak with a mean period of a driving unit as a searching period, FIG. 5 is a view for extracting a first peak value from a repetitive driving period of the driving unit, FIG. 6 is a view illustrating a numerical value of a first peak value illustrated in FIG. 5, FIG. 7 is a view for extracting a gradient value for a first peak value illustrated in FIG. 6, FIG. 8 is a view for extracting an average gradient value of first peak values between driving periods measured with an interval of unit times, FIG. 9 is a view for extracting a driving period from a driving unit which is repeatedly driven and paused, FIG. 10 is a view for extracting a driving period from a driving unit which is continuously driven, FIG. 11 is a view for extracting a second peak value from a repetitive driving period of the driving unit, FIG. 12 is a view for extracting a gradient value for a second peak value extracted in FIG. 11, FIG. 13 is a view for extracting an average gradient value of first peak values between driving periods measured with an interval of unit times, FIG. 14 is a view illustrating a peak interval between a first peak and a second peak of a driving period, FIG. 15 is a view for extracting a gradient value for the peak interval illustrated in FIG. 14, FIG. 16 is a view for extracting an average gradient value of the peak interval between driving periods measured with an interval of unit times, FIGS. 17 and 18 are views for detecting an abnormal state of a driving unit based on a peak interval between a first peak and a second peak measured in a real-time driving state of the driving unit, and FIGS. 19 and 20 are views for detecting an abnormal state of a driving unit based on a first peak value and a second peak value measured in a real-time driving state of the driving unit.

As illustrated in FIG. 1, the precise predictive maintenance method 100 for a driving unit according to an embodiment of the present invention includes a first base information collecting step S10, a second base information collecting step S20, a setting step S30, and a detecting step S40.

The first base information collecting step S10 is a step of collecting change information of an energy size in accordance with a time measured in a normal driving state of the driving unit by dividing the change information of the energy size into a first peak with the largest energy size and a second peak with a largest energy size after the first peak in which the change information of the energy size in accordance with the time of the driving unit is configured such that the driving periods including the first peak and the second peak are repeatedly formed and connecting the first peak energy value of the driving period and a first peak energy value of a repetitive another driving period to collect gradient information for the first peak energy value between the driving periods.

Here, a searching period is arbitrarily set in the driving period of the driving unit and the largest energy value during the set searching period is extracted as a first peak. Accordingly, another largest energy value after the searching period is naturally extracted as a second peak.

As a searching period as described above, the same period is set in the second base information collecting step S20 and the detecting step S40 which will be described below to extract the first peak.

In the meantime, the reason why the searching period as described above is arbitrarily set to extract the first peak will be described.

When a current consumed to operate the driving unit is assumed as the energy of the driving unit, generally, a high current is required at a timing of beginning the driving of the driving unit so that the energy size of the driving unit is formed to be maximum. Such a period is considered as a peak period. Further, when the driving unit is stabilized so that an energy value in a predetermined range is continuously maintained, the period is considered as a mean period.

As illustrated in FIG. 2, in the precise predictive maintenance method 100 for a driving unit of the present invention, the searching period is basically set as a peak period so that the first peak is extracted from the peak period and the second peak is extracted from the mean period to collect and compare the largest energy values in the respective periods to predict the state of the driving unit.

However, the searching period may be set in the range of an arbitrary specific period in consideration of the environments and conditions that the driving unit is used and the searching period is arbitrarily set to detect the state of the driving unit with various conditions so that the predictive maintenance of the driving unit may be more precisely performed.

For example, when precise predictive maintenance of the driving unit in the peak period is requested, as illustrated in FIG. 3, the searching period is set in a predetermined range in the peak period to extract both the first peak and the second peak in the peak period to detect the state of the driving unit. In contrast, when precise predictive maintenance of the driving unit in the mean period is requested, as illustrated in FIG. 4, the searching period is set in a predetermined range in the mean period to extract both the first peak and the second peak in the mean period to detect the state of the driving unit.

The information collected as described above becomes a base of various alarm values set to detect an abnormal sign of the driving unit in the setting step S30 and the detecting step S40 which will be described below.

In the meantime, an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit, but is not limited thereto.

The second base information collecting step S20 is a step of connecting a first peak energy value of a driving period and a first peak energy value of a repetitive another driving period in change information of an energy size in accordance with a time measured in a driving state of the driving unit before the malfunction of the driving unit is generated to collect gradient information for a first peak energy value between the driving periods.

The information collected as described above also becomes a base of various alarm values set to detect an abnormal sign of the driving unit in the setting step S30 and the detecting step S40 together with the information collected in the first base information collecting step S10.

The setting step S30 is a step of setting an alarm gradient value for the first peak energy value between the driving periods based on the gradient information collected in the base information collecting steps S10 and S20.

That is, the alarm gradient value for the first peak energy value between the driving periods may also be set based on a value when a gradient value for the first peak energy value between the driving periods is abnormally changed before the malfunction of the driving unit is generated based on information collected in the base information collecting steps S10 and S20 for a long time, that is, a value when the gradient value for the first peak energy value between the driving periods is abnormally changed in a situation such as deterioration, aging of the driving unit or load due to the jamming of the foreign material.

In the detecting step S40, when an average gradient value for the energy value of the first peak between the driving periods measured with the interval of unit times set in the real-time driving state of the driving unit exceeds the alarm gradient value set in the setting step S30, the driving unit is detected to be an abnormal state and the unit time is set to include at least two driving periods.

That is, in the first base information collecting step S10, as illustrated in FIG. 5, the first peak energy values are collected in repetitive driving periods of the driving unit and the first peak energy value of each of the driving periods is represented in accordance with the time. For the convenience of description, when the repetitive driving periods are sequentially defined as a first driving period, a second driving period, . . . and an n-th driving period, the peak interval may be represented as illustrated in FIG. 6.

Thereafter, as illustrated in FIG. 7, the first peak energy values of the driving periods are connected to acquire a predetermined gradient value. The gradient value may be divided into a rising gradient value (positive) with a rising gradient and a falling gradient value (negative) with a falling gradient. However, both the gradient values are digitized into absolute values to be collected.

The information about the gradient value collected as described above is recognized as information indicating that the driving unit is stably driven in a normal state.

In the second base information collecting step S20, in the same manner as the first base information collecting step S10, the gradient information for the first peak energy value between the driving periods of the driving unit before the malfunction of the driving unit is generated is collected. In the setting step S30, an alarm gradient value for the first peak energy value between the driving periods is set based on the gradient information collected in the base information collecting steps S10 and S20.

Therefore, in the detecting step S40, as illustrated in FIG. 8, when an average gradient value obtained by connecting the first peak energy values between the driving periods measured with the interval of unit times set in the real-time driving state of the driving unit exceeds the alarm gradient value set in the setting step S30, the driving unit is detected to be an abnormal state.

Here, the unit time is set in the setting step S30 to include at least two driving periods and may be set by several seconds as a smaller unit and also set by days, months, or years as a larger unit in consideration of the driving condition or surrounding environments of the driving unit.

Further, as the driving period, a period between a starting point and an ending point is set with the starting point when the energy value of the driving unit exceeds the offset value set in the setting step S30 and the ending point when the energy value falls below the offset value. By doing this, as illustrated in FIG. 9, a repetitive driving period may be clearly extracted from the driving unit which is repeatedly stopped and paused so that the predictive maintenance of the driving unit may be easily induced.

Moreover, even though the driving unit is paused and is not completely stopped, the offset value is set as illustrated in FIG. 9, so that the driving period of the driving unit may be forcibly extracted with a point when the energy value of the driving unit falls below the offset value as an ending point. Therefore, the predictive maintenance of the driving unit with various driving conditions may be easily induced.

Further, a repetitive driving period may be extracted by forcibly dividing the change information of the energy size in accordance with the time of the driving unit in accordance with a set peak interval and setting the divided period as the driving period.

That is, as illustrated in FIG. 10, when the driving unit is driven once, the driving unit is continuously driven without being stopped so that the repetitive driving period cannot be extracted. Therefore, the mean period is forcibly divided in accordance with the peak interval set in the setting step S30 to extract a plurality of driving periods so that the predictive maintenance of the driving unit with various driving conditions may be easily induced.

Here, the method of extracting the driving period of the driving unit by setting the offset value or the peak interval may also be applicable to the predictive maintenance method of the driving unit which will be described below.

Further, in the first base information collecting step S10, an energy value of the second peak of a driving period in a normal driving state of the driving unit and an energy value of a second peak in repetitive another driving period are connected to collect gradient information for an energy value of the second peak between the driving periods.

In the second base information collecting step S20, an energy value of the second peak of a driving period in a driving state of the driving unit before the malfunction of the driving unit is generated and an energy value of a second peak in repetitive another driving period are connected to collect gradient information for an energy value of the second peak between the driving periods.

In the setting step S30, an alarm gradient value for the energy value of the second peak between the driving periods is set based on the gradient information collected in the base information collecting steps.

In the detecting step S40, when an average gradient value for the energy value of the second peak between the driving periods measured with the interval of unit times set in the real-time driving state of the driving unit exceeds the alarm gradient value set in the setting step, the driving unit is detected to be abnormal state and the unit time is set to include at least two driving periods.

That is, as illustrated in FIG. 11, in the first base information collecting step S10, a second peak energy value in a repetitive driving period of the driving unit and a second peak energy value of another driving period are collected. For the convenience of description, when the repetitive driving periods are sequentially defined as a first driving period, a second driving period, . . . and an n-th driving period, it will be represented as illustrated in FIG. 11 below.

Thereafter, as illustrated in FIG. 12, the second peak energy values of the driving periods are connected to acquire a predetermined gradient value. The gradient value may be divided into a rising gradient value (positive) with a rising gradient and a falling gradient value (negative) with a falling gradient. However, both the gradient values are digitized into absolute values to be collected.

The information about the gradient value collected as described above is recognized as information indicating that the driving unit is stably driven in a normal state.

In the second base information collecting step S20, in the same manner as the first base information collecting step S10, the gradient information for the second peak energy value between the driving periods of the driving unit before the malfunction of the driving unit is generated is collected. In the setting step S30, an alarm gradient value for the second peak energy value between the driving periods is set based on the gradient information collected in the base information collecting steps S10 and S20.

Therefore, in the detecting step S40, as illustrated in FIG. 13, when an average gradient value obtained by connecting the second peak energy values between the driving periods measured with the interval of unit times set in the real-time driving state of the driving unit exceeds the alarm gradient value set in the setting step S30, the driving unit is detected to be an abnormal state.

Here, the unit time is set in the setting step S30 to include at least two driving periods and may be set by several seconds as a smaller unit and also set by days, months, or years as a larger unit in consideration of the driving condition or surrounding environments of the driving unit.

Further, in the first base information collecting step S10, a peak interval between the first peak and the second peak of the driving period in a normal driving state of the driving unit and a peak interval between the first peak and the second peak of repetitive another driving period are connected to collect gradient information of the peak interval between the driving periods.

In the second base information collecting step S20, a peak interval between the first peak and the second peak of the driving period in a driving state of the driving unit before the malfunction of the driving unit is generated and a peak interval of repetitive another driving period are connected to collect gradient information of the peak intervals between the driving periods.

In the setting step S30, an alarm gradient value for the peak interval between the driving periods is set based on the gradient information collected in the base information collecting steps S10 and S20.

In the detecting step S40, when an average gradient value for the peak interval between the driving periods measured in the interval of unit times set in the real-time driving state of the driving unit exceeds the alarm gradient value set in the setting step S30, the driving unit is detected to be an abnormal state and the unit time is set to include at least two driving periods.

That is, in the first base information collecting step S10, as illustrated in FIG. 14, a peak interval between the first peak and the second peak is collected in repetitive driving periods of the driving unit and the peak interval of each of the driving units is represented in accordance with the time. For the convenience of description, when the repetitive driving periods are sequentially defined as a first driving period, a second driving period, . . . and an n-th driving period, the peak interval will be illustrated in FIG. 15.

Thereafter, as illustrated in FIG. 15, the peak intervals of the driving periods are connected to acquire a predetermined gradient value. The gradient value may be divided into a rising gradient value (positive) with a rising gradient and a falling gradient value (negative) with a falling gradient. However, both the gradient values are digitized into absolute values to be collected.

The information about the gradient value collected as described above is recognized as information indicating that the driving unit is stably driven in a normal state.

In the second base information collecting step S20, in the same manner as the first base information collecting step S10, the gradient information for the peak interval between the driving periods of the driving unit before the malfunction of the driving unit is generated is collected. In the setting step S30, an alarm gradient value for the peak interval between the driving periods is set based on the gradient information collected in the base information collecting steps S10 and S20.

Therefore, in the detecting step S40, as illustrated in FIG. 16, when an average gradient value obtained by connecting the peak intervals between the driving periods measured with the interval of unit times set in the real-time driving state of the driving unit exceeds the alarm gradient value set in the setting step S30, the driving unit is detected to be an abnormal state.

Here, the unit time is set in the setting step S30 to include at least two driving periods and may be set by several seconds as a smaller unit and also set by days, months, or years as a larger unit in consideration of the driving condition or surrounding environments of the driving unit.

Further, in the first base information collecting step S10, a peak interval between the first peak and the second peak is collected from the change information of the energy size in accordance with a time measured in the normal driving state of the driving unit.

In the second base information collecting step S20, a peak interval between the first peak and the second peak is collected from the change information of the energy size in accordance with a time measured in a driving state of the driving unit before the malfunction of the driving unit is generated.

In the setting step S30, an alarm upper limit and an alarm lower limit for the peak interval between the first peak and the second peak are set based on the information collected in the base information collecting steps S10 and S20.

In the detecting step S40, a peak interval between the first peak and the second peak is measured from the change information of an energy size in accordance with a time measured in a real-time driving state of the driving unit and the driving unit is detected to be an abnormal state when the measured peak interval exceeds the alarm upper limit set in the setting step S30 or is lower than the alarm lower limit.

That is, the alarm upper limit and the lower limit for the peak interval between the first peak and the second peak is set based on a value that the peak interval of the driving unit is abnormally changed before the malfunction of the driving unit is generated, based on the information collected for a long time in the base information collecting steps S10 and S20.

Accordingly, when the peak interval between the first peak and the second peak measured in a real-time driving state of the driving unit exceeds the alarm upper limit as illustrated in FIG. 17 or when the peak interval between the first peak and the second peak measured in a real-time driving state of the driving unit is formed to be lower than the alarm lower limit as illustrated in FIG. 18, the driving unit is detected to be an abnormal state and an alarm is issued to perform management such as replacement or repairing before the malfunction of the driving unit is generated. Therefore, the economic loss to be caused by stopping the operation of the facilities due to the malfunction of the driving unit may be prevented in advance.

Further, in the first base information collecting step S10, the information about the energy value of the first peak and the energy value of the second peak is collected from the change information of the energy size in accordance with the time measured in the normal driving state of the driving unit.

In the second base information collecting step S20, the information about the energy value of the first peak and the energy value of the second peak is collected from the change information of the energy size in accordance with the time measured in the driving state of the driving unit before the malfunction of the driving unit is generated.

In the setting step S30, an alarm upper limit and an alarm lower limit for the energy value of the first peak and the second peak are set based on the information collected in the base information collecting steps S10 and S20.

In the detecting step S40, when the first peak or the second peak energy values of the change information of the energy size in accordance with the time measured in the real-time driving state of the driving unit exceeds the alarm upper limit of the first peak or the second peak set in the setting step S30 or is lower than the alarm lower limit, the driving unit is detected to be an abnormal state.

That is, as illustrated in FIGS. 19 and 20, during the process of driving the driving unit, when the energy value of the first peak or the energy value of the second peak exceeds the set alarm upper limit or is formed to be lower than the alarm lower limit, the driving unit is detected to be an abnormal state. Therefore, before the malfunction of the driving unit is generated, the driving unit is managed to be replaced or repaired in advance so that the economic loss to be caused by stopping the operation of the facilities due to the malfunction of the driving unit may be prevented in advance.

A precise predictive maintenance method 100 for a driving unit according to the present invention which detects an abnormal signal of the driving unit by the above-described process measures and collects a peak interval between a first peak and a second peak from driving information of a driving unit in a normal state and driving information of the driving unit before a malfunction is generated and sets an alarm upper limit and an alarm lower limit and an alarm gradient value for the peak interval based on the collected information to compare the peak interval collected in real time by the driving of the driving unit and a gradient value with the alarm upper limit, the alarm lower limit, and alarm gradient value to issue an alarm when a suspected abnormal sign condition of the driving unit is satisfied and induce the driving unit to be repaired or replaced at a right time, thereby preventing a huge loss caused by the malfunction of the driving unit in advance.

Further, the precise predictive maintenance method presents various detection conditions in order to search for various abnormal signs which may occur in the driving unit and issues an alarm to the user when the detection conditions are satisfied to not only easily detect various abnormal signs generated in the driving unit, but also ensure an excellent reliability for a detection result.

In the meantime, the precise predictive maintenance method 100 of the driving unit according to the embodiment of the present invention may also be implemented by a combination of various electronic devices and programs which are capable of collecting, detecting, comparing an energy value of the driving unit and issuing an alarm.

The present invention has been described with reference to the exemplary embodiment illustrated in the drawing, but the exemplary embodiment is only illustrative and the present invention is not limited thereto. Further, it would be appreciated by those skilled in the art that various modifications and equivalent exemplary embodiments may be made. Further, those skilled in the art may modify the present invention without departing from the spirit of the present invention. Accordingly, the scope of claiming the rights of the present invention is not defined within the scope of the detailed description, but may be limited by the following claims and the technical spirit thereof.

What is claimed is:

1. A precise predictive maintenance method for a driving unit, used for various facilities, the method comprising:
    a first base information collecting step S10 of collecting change information of an energy size in accordance with a time for a driving period measured in a normal driving state of the driving unit by dividing the change information of the energy size into a first peak with a largest energy size and a second peak with a largest energy size after the first peak in which the change information of the energy size in accordance with the time of the driving unit is configured such that driving periods including the first peak and the second peak are repeatedly formed and connecting a first peak energy value of the driving period and a first peak energy value of a repetitive another driving period to collect first gradient information for the first peak energy value between the driving periods;
    a second base information collecting step S20 of collecting the first gradient information for the first peak energy value between the driving periods by connecting the first peak energy value of the driving period in a driving state of the driving unit to the first peak energy value of the repetitive another driving period, before a malfunction of the driving unit is generated;
    a setting step S30 of setting a first alarm gradient value for the first peak energy value between the driving periods based on the first gradient information collected in the first and second base information collecting steps S10 and S20; and
    a detecting step S40 of detecting the driving unit to be an abnormal state when a first average gradient value for the first peak energy value between the driving periods measured with an interval of unit times set in a real-time driving state of the driving unit exceeds the first alarm gradient value set in the setting step S30,
    wherein the unit time is set to include at least two driving periods, a searching period is set in the driving period of the driving unit, a largest energy value in the set searching period is extracted as the first peak and the second peak is extracted in the driving period after the searching period, an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit.

2. The precise predictive maintenance method for a driving unit of claim 1, wherein:
    in the first base information collecting step S10, a second peak energy value of the driving period in the normal driving state of the driving unit and a second peak energy value of the repetitive another driving period are connected to collect second gradient information for the second peak energy value between the driving periods,
    in the second base information collecting step S20, the second peak energy value of the driving period in the driving state of the driving unit before the malfunction of the driving unit is generated and the second peak energy value of the repetitive another driving period are connected to collect the second gradient information for the second peak energy value between the driving periods,
    in the setting step S30, a second alarm gradient value for the second peak energy value between the driving periods is set based on the second gradient information collected in the first and second base information collecting steps S10 and S20, and
    in the detecting step S40, when a second average gradient value for the second peak energy value between the driving periods measured with the interval of unit times set in the real-time driving state of the driving unit exceeds the second alarm gradient value set in the setting step, the driving unit is detected to be the abnormal state, and the unit time is set to include at least two driving periods.

3. The precise predictive maintenance method for a driving unit of claim 1, wherein:
    in the first base information collecting step S10, the information about the first peak energy value and the second peak energy value is collected from the change information of the energy size in accordance with the time measured in the normal driving state of the driving unit,
    in the second base information collecting step S20, the information about the first peak energy value and the second peak energy value is collected from the change information of the energy size in accordance with the time measured in the driving state of the driving unit before the malfunction of the driving unit is generated,
    in the setting step S30, an alarm upper limit and an alarm lower limit for the first peak energy value and the second peak energy value are set based on the information collected in the first and second base information collecting steps S10 and S20, and
    in the detecting step S40, when the first peak energy value or the second peak energy value of the change information of the energy size in accordance with the time measured in the real-time driving state of the driving unit exceeds the alarm upper limit of the first peak or the second peak set in the setting step S30 or is lower than the alarm lower limit, the driving unit is detected to be the abnormal state.

* * * * *